US012226809B2

(12) United States Patent
Scherer et al.

(10) Patent No.: US 12,226,809 B2
(45) Date of Patent: Feb. 18, 2025

(54) CLEANING BASKET FOR CLEANING A BREATHING APPARATUS

(71) Applicant: MEIKO Maschinenbau GmbH & Co. KG, Offenburg (DE)

(72) Inventors: Marc Scherer, Hofstetten (DE); Marijan Simundic, Ohlsbach (DE); Bernd Ringwald, Ortenberg (DE); Stanislav Anselm, Offenburg (DE)

(73) Assignee: MEIKO Maschinenbau GmbH & Co. KG, Offenburg (DE)

( * ) Notice: Subject to any disclaimer, the term of this patent is extended or adjusted under 35 U.S.C. 154(b) by 526 days.

(21) Appl. No.: 17/594,720

(22) PCT Filed: Aug. 25, 2020

(86) PCT No.: PCT/EP2020/073715
§ 371 (c)(1),
(2) Date: Oct. 27, 2021

(87) PCT Pub. No.: WO2021/037834
PCT Pub. Date: Mar. 4, 2021

(65) Prior Publication Data

US 2022/0203410 A1 Jun. 30, 2022

(30) Foreign Application Priority Data

Aug. 26, 2019 (DE) ......................... 102019212775.4

(51) Int. Cl.
*B08B 3/04* (2006.01)
*B08B 3/02* (2006.01)

(52) U.S. Cl.
CPC ................ *B08B 3/047* (2013.01); *B08B 3/02* (2013.01)

(58) Field of Classification Search
CPC ... B08B 2203/0229; B08B 3/006; B08B 3/02; B08B 3/047; B08B 5/04; A61L 2202/24;
(Continued)

(56) References Cited

U.S. PATENT DOCUMENTS 3,881,503 A 5/1975 Fox et al.
4,433,698 A * 2/1984 Blaul .................... B08B 15/026 134/200

(Continued)

FOREIGN PATENT DOCUMENTS

CN 101224671 A 7/2008
CN 202822202 U * 3/2013

(Continued)

OTHER PUBLICATIONS

Machine translation of CN202822202U (Year: 2013).*

(Continued)

*Primary Examiner* — Douglas Lee
(74) *Attorney, Agent, or Firm* — Woodard, Emhardt, Henry, Reeves & Wagner, LLP

(57) ABSTRACT

A cleaning basket (120) for cleaning a breathing apparatus (112) is proposed. The cleaning basket (120) comprises at least one basket rack (140). Furthermore, the cleaning basket (120) comprises at least one mask holder (122) for holding at least one protective breathing mask (114) in the cleaning basket (120). Furthermore, the cleaning basket (120) comprises at least one suction element (156) which has at least one suction opening (160) and is configured to extend into the protective breathing mask (114) held by the mask holder (122). The suction element (156) is configured to be charged with negative pressure and to suck cleaning fluid out of at least one interior space (148) of the protective breathing mask (114) into the suction opening (160). Furthermore, a cleaning system (110) with the cleaning basket (120) and a
(Continued)

cleaning device (118), and a method for cleaning the breathing apparatus (112) are proposed.

25 Claims, 5 Drawing Sheets

(58) Field of Classification Search
CPC ............. A61B 2090/701; A61B 90/70; A61M 2209/10
See application file for complete search history.

(56) References Cited

U.S. PATENT DOCUMENTS

| | | | |
|---|---|---|---|
| 6,334,341 | B1 | 1/2002 | Hellhake et al. |
| 8,317,933 | B2 | 11/2012 | Bilias |
| 9,308,558 | B2 | 4/2016 | Ackermann et al. |
| 9,884,349 | B2 | 2/2018 | Falk et al. |
| 2004/0013370 | A1* | 1/2004 | Gerhard .................... B08B 3/02 385/85 |
| 2007/0154343 | A1* | 7/2007 | Kral ....................... A61B 1/125 422/1 |
| 2012/0139398 | A1* | 6/2012 | Smart .................... A61B 50/10 137/1 |
| 2013/0074882 | A1 | 3/2013 | Ackermann et al. |
| 2013/0319460 | A1 | 12/2013 | Schneider et al. |
| 2014/0365360 | A1 | 12/2014 | Ely |
| 2015/0314340 | A1* | 11/2015 | Falk .......................... B08B 3/02 134/99.1 |
| 2021/0187568 | A1 | 6/2021 | Falk et al. |

FOREIGN PATENT DOCUMENTS

| | | | |
|---|---|---|---|
| CN | 104918719 | A | 9/2015 |
| DE | 1174169 | B | 7/1964 |
| DE | 29822172 | U1 | 2/1999 |
| DE | 20003744 | U1 | 7/2000 |
| DE | 20003743 | U1 | 12/2000 |
| DE | 10020835 | A1 | 11/2001 |
| DE | 102005033618 | B3 | 11/2006 |
| DE | 102007009936 | A1 | 9/2008 |
| DE | 102007012768 | B4 | 9/2008 |
| DE | 102012220646 | B3 | 3/2014 |
| DE | 102015108857 | A1 | 12/2016 |
| DE | 102017219763 | A1 | 5/2019 |
| EP | 1088928 | A1 | 4/2001 |
| EP | 0935687 | B1 | 6/2001 |
| FR | 1333543 | A | 7/1963 |
| GB | 2478745 | A | 9/2011 |
| JP | 2001027693 | A | 1/2001 |
| JP | 2004528966 | A | 9/2004 |
| JP | 2006314947 | A | 11/2006 |
| JP | 2011521343 | A | 7/2011 |
| WO | 2011144518 | A2 | 11/2011 |

OTHER PUBLICATIONS

PCt, Int. App. No. PCT/EP2020/073715 International Preliminary Report on Patentability, 8 pages, Mar. 10, 2022.

PCT, Int. App. No. PCT/EP2020/073715 International Search Report (ISR), 4 pages, Dec. 9, 2020.

PCT, Int. App. No. PCT/EP2020/073715 Translation of International Search Report (ISR), 3 pages, Dec. 9, 2020.

PCT, Int. App. No. PCT/EP2020/073715 Written Opinion of International Search Authority, 5 pages, Dec. 9, 2020.

PCT, Int. App. No. PCT/EP2020/073715 International Preliminary Report on Patentability, 6 pages, Mar. 10, 2022.

* cited by examiner

CLEANING BASKET FOR CLEANING A BREATHING APPARATUS

TECHNICAL FIELD

The invention relates to a cleaning basket for cleaning and optionally additionally also for disinfecting breathing apparatus or else component parts of breathing apparatus. Furthermore, the invention relates to a cleaning system and to a method for cleaning breathing apparatus. Such devices and methods can be generally used for cleaning a breathing apparatus or component parts of same, for example a breathing apparatus for emergency services, such as firefighters, technical aid agencies or paramedics, breathing apparatuses for divers or generally for people who work in hostile or critical environments and for members of military forces and security forces, such as, for example, the police. The proposed devices and methods can also be used for breathing apparatuses in the medical sector, for example breathing masks for supplying oxygen and for carrying out operations. Other fields of use are also conceivable.

TECHNICAL BACKGROUND

Breathing apparatuses, such as, for example, protective breathing masks or breathing regulators, generally form part of the personal protective equipment of, for example, emergency services, military forces or security forces. For instance, a multiplicity of breathing apparatuses for various intended uses are known from the prior art. For example, emergency services, such as firefighters, use protective breathing masks with filters for removing harmful constituents from the respiratory air that is taken in. In many cases, however, what is referred to as a breathing regulator is used as an alternative or in addition to a filter, allowing the user to be ventilated with a respiratory gas, for example pressurized air. Breathing regulators, which are frequently also referred to as respiratory regulators, generally enable a user to breathe from a compressed gas cylinder or some other compressed gas connection and in this way to stay underwater, for example, or in some other atmosphere that can be breathed in or is toxic. For this purpose, the compressed gas, for example compressed air, from the compressed gas connection is adapted by the breathing regulator to a pressure prevailing in the user's working environment.

After each time they are used, the breathing apparatuses or component parts of same must generally be cleaned, sanitized, dried, checked, and repaired if necessary, and packed. The cleaning is intended to remove all contamination as a result of use or storage, so that the breathing apparatuses can be provided in a macroscopically clean and hygienically satisfactory state, for example, for the next steps of preparation. These requirements generally also apply to other component parts of breathing apparatuses, such as, for example, add-on and accessory parts of breathing masks, such as, for example, filters or breathing regulators.

In many cases, breathing apparatuses, such as, for example, breathing masks and accessories thereof, are either cleaned manually or in modified laundry washing machines with the aid of protective bags and/or with the aid of adaptors. For example, EP 0 935 687 B1 generally discloses a washing machine which has a tub with a drum. A shell of the drum has a bulged structure directed toward the interior of the drum, with holes at corner points of outer contours of the bulging directed toward the exterior of the drum. With such washing machines, it is possible in principle to clean items of equipment for emergency services particularly gently.

EP 1 088 928 A1 discloses a holding system for protective breathing masks in a laundry treatment machine. The holding system has a carrying strut, which is arranged in a drum of the laundry treatment machine so as to rotate therewith, and to which the protective breathing masks can be connected.

DE 200 03 743 U1 and DE 298 22 172 U1 respectively disclose devices for treating protective suits. In these cases, clothes hangers which comprise flexible air outlet nozzles are used. The clothes hangers are respectively fastened to a pivoting device. Cleaning of breathing apparatuses is generally not possible, or only with difficulty, by means of the devices shown.

DE 10 2015 108 857 A1 also describes a method for treating at least one protective suit, in particular a chemical protective suit, comprising the following steps:

a) at least one treatment adaptor is connected in a releasable and sealing manner to at least one opening of the protective suit,
b) a cleaning and disinfecting fluid is conducted via the at least one treatment adapter into the interior of the protective suit, and the cleaning and disinfecting fluid conducted into the interior of the protective suit is discharged from the protective suit,
c) a drying gas for drying the protective suit is conducted into the interior of the protective suit via the at least one treatment adaptor, and the drying gas which is conducted into the interior of the protective suit is discharged from the protective suit,
d) the at least one treatment adaptor is separated from the at least one opening of the protective suit.

DE 10 2005 033 618 B3 discloses a device for cleaning protective breathing masks. The device comprises a closable housing and at least one receptacle, which is arranged in a carrier, for at least one protective breathing mask. A nozzle arrangement and a brush arrangement are also provided, with a movement of the protective breathing masks allowing them to be brushed. However, an individual assignment and cleaning of accessory parts of masks is not possible by means of the disclosed device. Furthermore, the cleaning of gas-conducting elements, such as, for example, breathing regulators, is not possible with the disclosed device. DE 200 03 744 U1 also discloses a device for cleaning, disinfecting and drying protective breathing masks that has a carrying frame with an assigned nozzle system and individual treatment locations. This device is also not suitable in principle for cleaning gas-conducting elements and accessory parts.

DE 10 2007 009 936 A1 discloses a cleaning device for compressed air breathing apparatuses. This device has a receiving space bounded by a protective grid and rotating nozzle carriers. The nozzle carriers are in this case located outside the protective grid. However, a disadvantage of the device presented is that cleaning liquid can penetrate into gas-conducting regions.

By contrast, the cleaning of sensitive components of breathing apparatuses, such as, for example, breathing regulators, is generally performed manually. If necessary, manual cleaning can be assisted by placement in ultrasonic cleaning devices. However, DE 10 2007 012 768 B4 discloses a method and a device for cleaning breathing regulators. In this case, the items to be cleaned are fitted onto holders of a rotating element and repeatedly immersed in a liquid bath with cleaning liquid, disinfecting liquid and rinsing liquid. Breathing regulators are first of all charged here with compressed air to provide a seal between the valve and the tube connection and are then immersed in the liquid bath. However, a disadvantage of such immersion methods is that complex holders with corresponding actuators are required in order to ensure by appropriate movements that cleaning fluid is removed from the various cavities after cleaning.

DE 100 20 835 A1 describes a device for treating protective breathing masks. A receptacle for populating with protective breathing masks is provided, in which the protecting breathing masks are coupled to the receptacle by means of the breathing apparatus connection. It is furthermore described that a collecting device for collecting treatment agents, and a pump for supplying the treatment agents, are provided in a compartment of the device.

U.S. Pat. No. 3,881,503 A discloses a device for washing and decontaminating items of anesthetic equipment. A nozzle system is provided by means of which water jets can be sprayed at high pressure onto the items for cleaning.

DE 11 74 169 B describes a device for cleaning protective breathing masks. In this case, a housing is provided with a rotatably mounted tubular frame, in which the masks for cleaning are stretched over holders. By means of the rotary frame, the protective breathing masks are moved with a rotational movement through a bath of a cleaning liquid in a tub.

WO 2011/144518 A2 describes a cleaning device for cleaning breathing apparatuses. The cleaning device comprises at least one cleaning chamber for receiving at least one breathing apparatus, and also at least one fluid device for applying at least one cleaning fluid to the breathing apparatus. The cleaning device furthermore has at least one pressurization device with at least one pressure connection. The pressure connection is connectable to at least one gas-conducting element of the breathing apparatus. The pressurization device is configured to charge the gas-conducting element with compressed gas.

DE 10 2012 220 646 B3 describes a product range for cleaning breathing apparatuses, comprising at least two holders. In this case, a first holder is provided for cleaning breathing masks, with a pressurization device, and also a second holder for cleaning supporting frames.

Despite the advantages which have been and are achieved with the above-described devices and methods, numerous technical challenges remain. On technical challenge in the case of protective breathing masks, also referred to as breathing masks, is in particular that they are frequently of structurally complex design and have cavities in which cleaning fluid can accumulate. In particular in the region of the seals, which are typically constructed in a labyrinth-like manner, cleaning liquid collects frequently during and at the end of a cleaning program. These liquid residues typically have to be emptied from the cleaning devices manually after removal of the protective breathing masks, but this may be to the detriment of the hygiene of the cleaned protective breathing masks. In addition, the manual emptying includes an additional cost for the operation of the cleaning device. If, by contrast, the protective breathing masks are not sufficiently emptied, the drying time is increased accordingly during subsequent drying, either within the cleaning device itself or else, for example, in a separate drying cabinet. A further challenge in conjunction with liquid residues in the protective breathing masks also consists in particular in that, when the protective breathing masks are removed from the cleaning device, said liquid residues may pass onto the floor of the work area. This can cause a risk of an accident at the workplace.

OBJECT OF THE INVENTION

It would therefore be desirable to provide a cleaning basket, a cleaning system and a method for cleaning and optionally additionally also for disinfecting a breathing apparatus that at least substantially avoid the disadvantages of known devices and methods of the type mentioned. In particular, the intention is to enable cleaning of protective breathing masks, the cleaning including sufficient sanitization and accelerated drying of the protective breathing masks in comparison to conventional devices and methods, with at the same time a low risk of accident due to leaking cleaning fluid, in particular leaking cleaning liquid.

GENERAL DESCRIPTION OF THE INVENTION

This object is addressed by a cleaning basket, a cleaning system and a method for cleaning and optionally additionally also for disinfecting a breathing apparatus, having the features of the independent patent claim. Advantageous developments, which can be realized individually or in any desired combination, are set out in the dependent claims.

Hereinafter, the terms "have", "comprise", "encompass" or "include" or any grammatical deviations therefrom are used in a non-exclusive way. Accordingly, these terms can refer either to situations in which, besides the features introduced by these terms, no further features are present, or to situations in which one or more further features are present. By way of example, the expression "A has B", "A comprises B", "A encompasses B" or "A includes B" can refer either to the situation in which, apart from B, no further element is present in A (i.e. to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms, if they are used in association with one or more elements or features and are intended to express the fact that the element or feature can be provided singly or multiply, are generally used just once, for example when the feature or element is introduced for the first time. When the feature or element is subsequently mentioned again, the corresponding term "at least one" or "one or more" is generally no longer used, without this restricting the possibility that the feature or element can be provided singly or multiply.

Furthermore, hereinafter, the terms "preferably", "in particular", "for example" or similar terms are used in connection with optional features, without alternative embodiments thereby being restricted. In this regard, features introduced by these terms are optional features and there is no intention for the scope of protection of the claims, and in particular of the independent claims, to be restricted by these features. In this regard, the invention, as will be recognized by a person skilled in the art, can also be carried out using other configurations. In a similar manner, features introduced by "in one embodiment of the invention" or by "in one exemplary embodiment of the invention" are understood as optional features, without alternative configurations or the scope of protection of the independent claims being intended to be restricted thereby. Furthermore, these introductory expressions are intended to have no effect on all possibilities of combining the features introduced thereby with other features, whether they be optional or non-optional features.

In a first aspect of the present invention, a cleaning basket for cleaning a breathing apparatus is proposed.

The term "cleaning basket", as is used here, also referred to as "flushing basket", is a broad term which is to be given its customary and common meaning, as understood by a person skilled in the art. The term is not restricted to a specific or adapted meaning. The term may, without restriction, refer in particular to a portable receiving device, in which items for cleaning can be accommodated, can be introduced into a cleaning device, for example a dishwasher, and can subsequently be removed again from the cleaning device in a cleaned state. Alternatively, the cleaning basket may also be installed, for example, permanently in a cleaning device. For example, the cleaning basket can be fastened in a rail system of the cleaning device and can be pushed via said rail system into a cleaning chamber of the cleaning device and pulled out again from the cleaning chamber following cleaning. Furthermore, cleaning baskets can also be used for temporary storage of items for cleaning. The cleaning basket can in particular have a multiplicity of openings such that liquid can drip downward. The cleaning basket can have in particular a substantially cuboidal configuration, with a basket base which, for example, can have a square or generally rectangular outline, and which has a supporting surface for placing the cleaning basket onto a flat work surface. Optionally, one or more basket walls can extend upward from the basket base, for example with a protruding edge and furthermore optionally other elements, such as, for example, handles.

The term "breathing apparatus", as is used here, is a broad term which is to be given its customary and common meaning, as understood by a person skilled in the art. The term is not restricted to a specific or adapted meaning. The term may, without restriction, refer in particular to a device which is configured in a suitable manner for protecting the respiratory tracts of a user from harmful influences. For example, the breathing apparatus may be a device which is configured for the complete or partial filtering of ambient air and/or for the provision of respiratory gas to at least one user. These breathing apparatuses may be complete, operationally ready breathing apparatuses, or else component parts thereof, and consequently no distinction is made below, in terms of terminology, between breathing apparatuses and their component parts.

The breathing apparatus may in particular encompass at least one protective breathing mask, also referred to as a breathing mask. The term "protective breathing mask", as is used here, is a broad term which is to be given its customary and common meaning, as understood by a person skilled in the art. The term is not restricted to a specific or adapted meaning. The term may, without restriction, refer in particular to a device which is a component part of a breathing apparatus and which is configured to cover all or part of a user's face, in particular a mouth potion and/or nose portion. The covering can serve in particular for protecting the respiratory tracts of the user against harmful substances and/or for conducting respiratory gases into the respiratory tracks and/or conducting respiratory gases out of the respiratory tracks. The protective breathing mask can furthermore cover further portions of the face and/or head of the user, for example the eyes. Accordingly, the protective breathing mask may in particular also have at least one transparent viewing window. The protective breathing mask can furthermore have at least one seal, for sealing an interior space of the protective breathing mask from an exterior, wherein the interior space is bounded, for example during operation of the protective breathing mask, by the protective breathing mask itself, the user's head and the seal of the protective breathing mask. In particular, the protective breathing mask can be of convex design, with at least one cavity being formed which is partially closed off by the protective breathing mask and the edges of which are formed, for example, by the at least one seal. In particular, the protective breathing mask can have a wall which is preferably configured completely or partially flexibly and which covers the mouth and nose and optionally further regions of the face, for example the eyes. The seal can have in particular at least one sealing lip which seals the protective breathing mask against the face such that said interior space between face and protective breathing mask is designed as a sealed region. Furthermore, the protective breathing mask, as will be explained in more detail below, can have at least one fixing for fastening on the head of the user, for example at least one belt, at least one fixing band or at least one fastening which consists of a plurality of bands and is frequently referred to as banding or webbing. The breathing mask can have, for example, at least one opening and can be configured, for example, to enable an air supply or respiratory gas supply. For example, the respiratory mask can have at least one thread for the connection of a respiratory gas supply. Furthermore, the protective breathing mask can have, for example, at least one exhalation valve. The protective breathing mask can be produced, for example, entirely or partially from a flexible material, in particular from at least one elastomer material, for example rubber and/or silicone.

Furthermore, the breathing apparatus can comprise further components. In particular, the breathing apparatus can furthermore comprise at least one of the following elements: tubes, valves, filters, compressed gas containers, breathing regulators or combinations of the elements mentioned and/or of other elements.

The term "cleaning", as is used here, is a broad term which is to be given its customary and common meaning, as understood by a person skilled in the art. The term is not restricted to a specific or adapted meaning. The term may, without restriction, refer in particular to an operation in which items for cleaning are freed from adhering macroscopic or even microscopic impurities and/or in which such impurities are at least partially eliminated. In addition, a disinfecting effect can optionally be carried out.

The proposed cleaning basket for cleaning a breathing apparatus comprises at least one basket rack. Furthermore, the cleaning basket comprises at least one mask holder for holding at least one protective breathing mask in the cleaning basket. Furthermore, the cleaning basket comprises at least one suction element which has at least one suction opening and is configured to extend into the protective breathing mask held by the mask holder. The suction element is configured to be charged with negative pressure and to suck cleaning fluid out of at least one interior space of the protective breathing mask into the suction opening. This charging with negative pressure can take place in particular during or after cleaning fluid is applied to the breathing apparatus.

The term "basket rack", as is used here, is a broad term which is to be given its customary and common meaning, as understood by a person skilled in the art. The term is not restricted to a specific or adapted meaning. The term can refer, without restriction, in particular to a mechanical basic structure of the cleaning basket, which basic structure can in particular have a basket base, and additionally one or more basket walls which can in particular extend from the basket base. The basket rack can be produced in particular entirely or partially from at least one material, selected from the group consisting of a plastic and metal. The basket rack can be configured, for example, entirely or partially as a wire rack, for example as a wire grating. Alternatively or additionally, the basket rack can also be entirely or partially configured as a plastics rack, for example as a plastics rack with a plurality of openings, for example as a plastics grating. In particular, the basket rack can have, for example, one or more openings so that cleaning fluid can flow out of an interior of the basket rack. The basket rack can, for example, entirely or partially have a cuboidal basic structure, for example with a rectangular supporting surface.

The term "mask holder", as is used here, is a broad term which is to be given its customary and common meaning, as understood by a person skilled in the art. The term is not restricted to a specific or adapted meaning. The term can, without restriction, refer in particular to a device which is configured to hold at least one protective breathing mask, in particular during a cleaning operation. The mask holder can in particular have at least one projection which extends from the cleaning basket and in particular from a base of the cleaning basket and/or a wall of the cleaning basket, for example into an interior space of the cleaning basket and/or upward from the cleaning basket, and which is configured to hold and/or to fix the at least one protective breathing mask, in particular at a distance from a base of the cleaning basket. The mask holder can be produced, for example, entirely or partially from at least one plastic and/or entirely or partially from at least one metallic material. The mask holder can also be entirely or partially connected to the basket rack or else formed integrally with the basket rack.

The term "suction element", as is used here, is a broad term which is to be given its customary and common meaning, as understood by a person skilled in the art. The term is not restricted to a specific or adapted meaning. The term can, without restriction, refer in particular to a device or an element configured to remove at least one fluid from a specified region by the suction operation, in particular by application of a negative pressure. In particular, the suction element can have at least one element selected from the group consisting of a pipe, a tube and a channel, wherein the element has at least one opening through which fluid can enter the element, and wherein the element itself can be charged with a negative pressure. For example, the element can have at least one connection to at least one negative pressure source or vacuum source or for the connection of at least one negative pressure source or vacuum source, wherein the connection is connected fluidically to the at least one opening, which can also be referred to as a suction opening.

Accordingly, the term "suction opening", as is used here, is a broad term which is to be given its customary and common meaning, as understood by a person skilled in the art. The term is not restricted to a specific or adapted meaning. The term can, without restriction, refer in particular to an opening in a wall of the suction element, through which opening fluid can enter an interior space, for example into a lumen, which can be charged with a negative pressure, of the suction element. The opening can in principle have any desired cross section, for example a round, oval or polygonal cross section. For example, one single opening or a plurality of openings can be provided in the wall of the suction element. For example, the at least one suction opening can comprise at least one passage opening in at least one wall of a pipe, a tube or a channel of the suction element.

The suction element can be entirely or partially connected to the mask holder and/or integrated in the mask holder. Accordingly, the suction element can also be formed, for example, as a component part of the mask holder and/or can be connected fixedly or releasably to the mask holder. Alternatively or additionally, the suction element can, however, also be connected entirely or partially fixedly or releasably to other component parts of the cleaning basket or can be entirely or partially integrated in other component parts of the cleaning basket. The suction element can thus also be connected to the basket rack. A fixed or else a releasable connection is conceivable here. For example, the suction element can be configured to be connected releasably to one or other component parts of the cleaning basket, for example to the basket rack or to the mask holder, and to be removed, for example, for cleaning purposes.

As explained above, the suction element is configured to extend into the protective breathing mask held by the mask holder. Accordingly, the suction element can in particular have an elongate element, for example an element, the longitudinal extent of which exceeds its lateral extent by at least a factor of 2, for example by at least a factor of 3. In particular, the suction element can accordingly be configured, for example, as a tube or pipe or else as a loop of a tube or a pipe, in order to extend into at least one interior space of the protective breathing mask. In terms of space, the suction element can be positioned in particular in such a manner that it protrudes out of the mask holder or protrudes from the mask holder such that, when the protective breathing mask is accommodated on the mask holder, the suction element extends into an interior space which is formed, for example, by a wall of the protective breathing mask, which wall faces the mask holder. The suction element can be configured here to be rigid or else, preferably, flexible, as will be explained in more detail below, and therefore the suction element can be introduced, for example, flexibly into the interior space and, for example, can be introduced specifically into a space at a seal of the protective breathing mask in order to suck off cleaning fluid there.

Furthermore, as explained above, the suction element is configured to be charged with negative pressure. As explained above, this charging with negative pressure and thus the suction operation while the at least one cleaning fluid is applied to the breathing apparatus or else after the cleaning fluid has been applied can take place, for example, during a drying step or before a drying step. By means of the charging of the suction element with negative pressure, cleaning fluid is sucked out of the at least one interior space of the protective breathing mask into the suction opening. For this purpose, the suction element, as explained above, can have, for example, at least one lumen which is surrounded, for example, by a wall of the suction element, for example a lumen of a pipe, of a tube or of a channel of the suction element. The suction opening here can penetrate, for example, the wall which surrounds the lumen, and therefore cleaning fluid can enter the lumen through the suction opening. The lumen can in particular be elongated. The lumen can be connected or connectable, for example, at at least one connecting point to at least one negative pressure source, also referred to as a vacuum source, for example at at least one port or at a different type of connecting point.

The term "cleaning fluid", as is used here, is a broad term which is to be given its customary and common meaning, as understood by a person skilled in the art. The term is not restricted to a specific or adapted meaning. The term can, without restriction, refer in particular to a liquid which, upon impinging upon items for cleaning, can deploy a cleaning action. Accordingly, hereinafter, the term "cleaning liquid" instead of the term "cleaning fluid" is also used without restricting the use of other fluid media. In particular, the cleaning liquid can comprise an aqueous liquid, for example water and/or water with one or more additives, for example with one or more cleaning agent concentrates and/or rinse aids and/or disinfectants. Cleaning fluid can be applied to the breathing apparatus in such a manner that an individual cleaning liquid is used, or else in such a manner that a combination of a plurality of cleaning liquids is used. If a plurality of cleaning liquids are provided, the different cleaning liquids can be applied simultaneously or else sequentially. The cleaning basket with the breathing apparatus can remain, for example, in a stationary manner within a cleaning chamber of a cleaning device and the various cleaning liquids and/or cleaning fluids can be applied successively.

As furthermore explained above, the cleaning fluid can in particular comprise at least one cleaning fluid selected from the group consisting of: an aqueous cleaning fluid; a cleaning fluid with at least one cleaning agent solution; a cleaning fluid with at least one rinse aid; a cleaning fluid with at least one disinfectant; a post-rinsing fluid; demineralized water; and a heated cleaning fluid, in particular a cleaning fluid heated to a temperature of 30° C. to 70° C. and particularly preferably 60° C.

"Cleaning fluid is applied" can be understood here in general as meaning any desired bringing of the items for cleaning, in this case the breathing mask, into contact with the at least one cleaning fluid. This can take place, for example, in the form of a direct application, for example by sprinkling, dripping, spraying or a combination of the abovementioned and/or other direct types of application, in which the cleaning fluid impinges directly against the items for cleaning, for example the breathing apparatus and/or the breathing mask. This configuration of the application can take place in particular in the case of a fixed cleaning chamber. Alternatively or additionally, the application can also take place in such a manner that the cleaning chamber is completely or partially filled with cleaning fluid such that the items for cleaning which are accommodated in the cleaning chamber come into contact with the cleaning fluid at least in one position of the cleaning chamber. This configuration of the application can be used in particular in the case of a configuration of the cleaning chamber as a movable cleaning chamber, for example in the form of a drum. Combinations of the types of application mentioned and/or other types of application are also possible. Irrespective of whether the cleaning chamber is configured to be rigid or movable, the cleaning fluid can be applied in the simple operating mode by the cleaning fluid merely being applied once to the items for cleaning, for example the breathing apparatus and/or the breathing mask. Alternatively or additionally, however, cleaning can also take place in the circulating operating mode by cleaning fluid being applied repeatedly to the items for cleaning. Such circulating operating modes and circulating circuits are known, for example, from conventional washers.

The suction element can in particular have at least one element selected from the group consisting of: a suction pipe with the at least one suction opening, in particular a curved suction pipe; a suction tube with the at least one suction opening; a U pipe with the at least one suction opening; a pipe loop; a disk-shaped suction element with the at least one suction opening; a spoon-shaped suction element with the at least one suction opening. Different forms are in principle also possible. For example, different pipe-shaped or tubular elements are also in principle possible. Alternatively or additionally, one or more suction elements can also be used that do not have a pipe shape but that have, for example, at least one suction opening and at least one internal structure with which cleaning fluid can be sucked off. For example, as explained above, a disk-shaped or spoon-shaped element via which the protective breathing mask is held and/or is accommodated in the cleaning basket is conceivable. This element, for example at its lowest point, can have at least one suction opening, and cleaning fluid can be sucked off, for example via the entire interior space or via integrated channels.

As explained above, the suction element can be configured in particular at least partially, for example at least in sections, to be flexible, in particular resilient. Accordingly, the suction element can be configured, for example, to be deformable, wherein the deformation can be possible, for example, by a force which can be applied manually. The deformation can be plastic or else elastic. The suction element can thus be produced, for example, from a plastically or elastically deformable or bendable metal pipe or plastics pipe. The use, for example, of an expansion bellows in order to permit a deformation is also conceivable.

In particular, the suction element can have at least one suction pipe and/or at least one flexible tongue for the introduction into the interior space of the protective breathing mask. Said flexible tongue can be designed, for example, as a conductor loop or as a curved end of a pipe or tube of the suction element. In particular the at least one suction opening can be introduced in the flexible tongue such that said suction opening can be arranged within the interior space of the protective breathing mask when the flexible tongue extends into said interior space of the protective breathing mask. Alternatively or additionally, the suction element can also be configured in such a manner that the flexibility does not arise or does not exclusively arise from its form or from its material, but rather that a rigid suction element is fastened resiliently or elastically and can thereby be easily introduced into the interior space of the breathing mask.

The suction element can be connected in particularly directly or indirectly to the mask holder, in particular can be at least partially integrated in the mask holder. In particular, the suction element can be integrated in the mask holder in such a manner that the suction opening is arranged between the basket rack and a point of the mask holder that protrudes the furthest out of the basket rack. This can serve in particular to arrange the suction opening at a lowest possible point within the interior of the protective breathing mask, at which point the cleaning fluid collects because of gravity.

The basket rack, as explained above, can have in particular at least one rack base and rack walls. The rack base and/or the rack walls can be produced in particular entirely or partially from at least one metallic material and/or entirely or partially from at least one plastics material. The mask holder and the suction element can be connected, fixedly or releasably, to the basket rack.

In particular, the mask holder can have at least one projection protruding from the basket rack. The protective breathing mask can be attached or stretched, for example, onto said projection.

The mask holder can have in particular a wire rack, for example made from a round wire, in order not to damage the sensitive protective breathing masks by sharp edges as they are being stretched on. The wire rack can be produced from a metallic material or else, for example, from a plastics material.

The cleaning basket can have in particular at least one suction line. Said suction line can be designed, for example, as a pipe, tube or channel and can be, for example, connected fixedly to the basket rack or else integrated in the basket rack, for example in a basket base of the basket rack. The suction element can be fluidically connected to the suction line. For example, the suction element can be connected in one piece to the suction line or else can be configured independently of the suction line, but fluidically connected thereto. In particular, a lumen of the suction element can be connected or connectable to a lumen of the suction line. The suction line can in particular have at least one connection for the connection, in particular for the releasable connection, of a suction device which can be in particular entirely or partially a component part of a cleaning device. The at least one connection can thus have, for example, a pressure port or a screw connection to which a vacuum line of the cleaning device, into which the cleaning basket can be introduced or has been introduced, is connected. The pressure port can have, for example, a quick-acting closure, for example a bayonet closure.

The suction device to which the at least one suction line is connectable and which will be described in more detail below can be entirely or partially integrated in the cleaning device which accommodates the at least one cleaning basket. Alternatively or additionally, however, the suction device can also be at least partially integrated in the cleaning basket. For example, component parts of a suction device, such as, for example, a Venturi nozzle, described in more detail below, can be located directly on the or in the cleaning basket, for example can be connected to the basket rack or can be integrated in the basket rack. In this case, for example, the suction line can be connectable directly or indirectly to said suction device, which is entirely or partially integrated in the cleaning basket or is fixedly or releasably connected to the cleaning basket, with a fixed or releasable connection being conceivable.

If the suction device is entirely or partially integrated in the cleaning basket, the cleaning device can, for example, support or activate the suction device or else charge same with energy. In particular, the suction device can be configured to be charged with compressed air by the cleaning device, for example if the suction device has at least one pump, for example a Venturi nozzle. In this case, a negative pressure supply on the part of the cleaning device is not absolutely necessary.

A complete or partial integration of the suction device in the cleaning basket can also be advantageous for construction space reasons. For example, a construction space for the suction device can be saved in the cleaning device itself.

A configuration in which the suction device is entirely or partially integrated in the cleaning basket is in particular also usable in order to accommodate items for cleaning according to item type. For example, a cleaning basket according to the invention can be populated with protective breathing masks, with other cleaning baskets being able to be populated, for example, with breathing regulators, as described, for example, in WO 2011/144518 A2. In the latter case, the cleaning device can in any case already have a pressurization device, for example a compressed air source, which can then also be used for operating the suction device. By means of a controller of the cleaning device, the desired time sequence of the pressurization can then be activated, for example by the selection of the corresponding cleaning program, for example by means of a valve connected upstream. For example, during cleaning of the breathing regulators, a pressurization can take place continuously whereas, during cleaning of the protective breathing masks, the pressurization and thus the operation of the suction device can take place, for example, only at the end of a rinsing operation.

A plurality of different types of cleaning baskets can be used in the cleaning device, including the cleaning basket proposed here. It is also conceivable here for the cleaning baskets and in particular also the cleaning basket proposed here to be coded and, for example, to have at least one identifier. The at least one identifier can comprise, for example, at least one optical, electronic or magnetic identifier, for example a barcode or an RFID label. A purely mechanical coding and scanning, for example, by means of an electromagnetic cam switch are also conceivable. In general, the cleaning device can be configured, for example, to identify the cleaning basket and, for example, to correspondingly select and/or adapt a cleaning program in a manner controlled in particular by the controller. This identification can take place, for example, via at least one sensor of the cleaning device.

As explained above, the cleaning basket is configured with the suction element in order to suck off cleaning fluid which has penetrated the protective breathing mask of the breathing apparatus out of the interior space of the protective breathing mask. In addition, however, the cleaning basket can furthermore also be configured to protect at least one gas-conducting element of the breathing apparatus by pressurization during the cleaning with the cleaning fluid, as described, for example, in WO 2011/144518 A2. Accordingly, the cleaning basket can furthermore have at least one pressure connection which is connectable to at least one gas-conducting element of the breathing apparatus, wherein the gas-conducting element can be charged with compressed gas while the cleaning fluid is being applied to the breathing apparatus. In this way, suction of cleaning fluid, which has undesirably penetrated, out of an interior space of the protective breathing mask can be combined with efficient prevention of cleaning fluid, which has undesirably penetrated, in the at least one gas-conducting element, for example the breathing regulator. The pressure connection can comprise in particular at least one form-fitting and/or force-fitting connecting element in order additionally to produce a mechanical connection to the breathing apparatus, in particular a quick-acting coupling and/or a thread. The cleaning basket can have in particular a releasable compressed gas connection for connecting the pressure connection to a pressurization device of a cleaning device, in particular a cleaning device into which the cleaning basket can be introduced.

As explained above, the pressure connection can also be used for the suction in particular when the suction device is entirely or partially integrated in the cleaning basket. The pressure connection can thus have a plurality of functions.

As explained above, the cleaning basket can be configured to clean the breathing apparatus with at least one protective breathing mask and optionally with at least one gas-conducting element. However, the cleaning basket can additionally also be configured to clean further component parts of the breathing apparatus. Thus, in particular, at least one small parts basket for receiving small parts of the breathing apparatus can be additionally arranged in the cleaning basket, in particular a closable small parts basket with a basket cover.

In a further aspect of the present invention, a cleaning system for cleaning a breathing apparatus is proposed, in particular for cleaning breathing apparatuses with at least one protective breathing mask and optionally at least one breathing regulator. The cleaning system comprises:

at least one cleaning basket according to the invention, for example according to one or more of the above-described configurations and/or according to one or more of the embodiments yet to be described below, and at least one cleaning device, wherein the cleaning device has at least one cleaning chamber for receiving the at least one cleaning basket, wherein the cleaning device furthermore has at least one application device for applying at least one cleaning fluid to the breathing apparatus.

The cleaning system furthermore comprises at least one suction device which is connectable to the suction element of the cleaning basket and is intended for generating the negative pressure. As explained above, the suction device can be entirely or partially integrated here in the cleaning device. Alternatively or additionally, the suction device can also be entirely or partially integrated in the cleaning basket.

The term "cleaning system", as is used here, is a broad term which is to be given its customary and common meaning, as understood by a person skilled in the art. The term is not restricted to a specific or adapted meaning. The term can, without restriction, refer in particular to a system, i.e. to an entirety of at least two functionally interacting components, said system serving for the cleaning within the meaning of the above definition.

The term "cleaning device", as is used here, is a broad term which is to be given its customary and common meaning, as understood by a person skilled in the art. The term is not restricted to a specific or adapted meaning. The term can, without restriction, refer in particular to a device which is configured to free items for cleaning from adhering macroscopic or microscopic impurities or to at least partially remove such impurities. In addition, a disinfecting effect can optionally be carried out. The cleaning device, as will be explained further below, can be configured in particular as a washer, in particular as a dishwasher. The washer can be configured here, for example, as a single-chamber washer, in particular as a commercial single-chamber washer with a multi-circuit rinsing system, as a front-loading machine or else as a hood-type washer, in particular as a pass-through washer. Dishwashers with an exchange of water, in particular what are referred to as single-circuit systems, are also usable. Alternatively or additionally to dishwashers, different types of cleaning devices can also be used.

The cleaning device comprises at least one cleaning chamber. The term "cleaning chamber", as is used here, is a broad term which is to be given its customary and common meaning, as understood by a person skilled in the art. The term is not restricted to a specific or applied meaning. The term can, without restriction, refer in particular to a completely or partially closed chamber, within which the cleaning operation can be completely or partially carried out. The cleaning chamber can have in particular at least one housing which entirely or partially surrounds the cleaning chamber. A single cleaning chamber can be provided here, or in principle also a plurality of cleaning chambers, can be provided, for example sequentially. The cleaning chamber can have, for example, at least one opening for loading the cleaning chamber with the items for cleaning. For example, this one opening can be provided with a flap arranged on a front side of the cleaning chamber and/or on an upper side of the cleaning chamber. Alternatively, hoods for closing the cleaning chamber are also possible, for example within the scope of what are referred to as hood-type dishwashers or push-through washers. Other configurations are in principle also possible.

The cleaning chamber is configured for receiving the at least one cleaning basket. For this purpose, the cleaning chamber can have, for example, at least one basket receptacle, for example at least one rail, into which the cleaning basket can be pushed, and/or at least one holding device or transport device, by means of which the basket can be transported into the cleaning chamber, out of the cleaning chamber or through the cleaning chamber.

The cleaning device can furthermore have at least one application device for applying at least one cleaning fluid to the breathing apparatus. The application device can be configured in particular for applying the at least one cleaning fluid to the breathing apparatus in the cleaning chamber. The application device can have, for example, at least one tank for receiving the at least one cleaning fluid and, for example, one or more nozzles. In particular, the application device can have, for example, at least two nozzle arms received in the cleaning chamber. In addition, the application device can have further elements, such as, for example, one or more pumps for transporting the cleaning fluid to the at least one nozzle, and one or more pipelines. The application device can be controlled in particular by at least one controller of the cleaning device.

The term "application device", as is used here, is a broad term which is to be given its customary and common meaning, as understood by a person skilled in the art. The term is not restricted to a specific or adapted meaning. The term can, without restriction, refer in particular to basically any desired device by means of which the at least one cleaning fluid, in particular the at least one cleaning liquid, can be applied to the items for cleaning within the cleaning chamber. The application device has, for example, at least one nozzle system with at least one nozzle, for example with one or more nozzle arms which can be arranged, for example, above and/or below the items for cleaning. Furthermore, the application device can comprise at least one pump and at least one conducting system, for supplying cleaning liquid to the nozzle system. For example, a nozzle system and a line system for applying with cleaning liquid from a tank, and also at least one corresponding pump, can be provided. Alternatively or additionally, for example, at least one nozzle system can also be supplied from a feed line without a pump being required for this purpose. The cleaning device can be configured in particular as a cleaning device with two tanks, a washing tank and a rinsing tank. Accordingly, the application device can comprise in particular a washing system and a rinsing system, wherein, for example, the washing system can have the washing tank and a washing nozzle system and also a washing line system and a washing pump, for example a recirculating pump. The rinsing system can have, for example, a rinsing tank which is separate from the washing tank, and furthermore a rinsing nozzle system, a rinsing line system and optionally a rinsing pump. The rinsing nozzle system and the washing nozzle system can be formed, for example, entirely or partially separately. However, said nozzle systems can optionally also be entirely or partially combined, for example in a common housing.

As explained above, the application device can have in particular at least one nozzle. Said at least one nozzle can comprise in particular at least one nozzle selected from the group consisting of: a spray nozzle; a rinsing nozzle; a spray arm, in particular a rotatable spray arm; a nozzle which can be operated in the recirculating operating mode.

The cleaning device can be configured, for example, in order to carry out at least one cleaning program by means of the application device, for example in a manner controlled by at least one controller of the cleaning device, in which the items for cleaning, for example the at least one cleaning basket with the breathing apparatus, is accommodated in a stationary manner in the cleaning chamber and cleaning fluid is applied in differing ways successively in one or more cleaning steps of the cleaning program, for example first of all in at least one washing step with the at least one washing fluid and in at least one rinsing step with the at least one rinsing fluid. Furthermore, at least one drying step can be provided which is, for example, mounted downstream of the application of the cleaning fluid in the one cleaning chamber when the items for cleaning are accommodated in a stationary manner. Accordingly, the cleaning device can be configured in particular as an automatic programmed washer. Alternatively, however, the cleaning device can also be configured, for example, as a transport cleaning device, in which the cleaning basket with the breathing apparatus is transported through one or more cleaning zones.

The term "tank", as is used here, is a broad term which is to be given its customary and common meaning, as understood by a person skilled in the art. The term is not restricted to a specific or adapted meaning. The term can, without restriction, refer in particular to a completely or partially closed vessel which is configured for receiving at least one fluid, in particular at least one liquid. As explained above, the at least one tank can have, for example, at least one washing tank. Said at least one washing tank can be arranged, for example, in a base of the cleaning chamber or else can be fluidically connected to a base of the cleaning chamber such that cleaning fluid can flow out of the cleaning chamber into the washing tank. For example, the washing tank can be separated from the cleaning chamber by at least one strainer. In addition to the at least one washing tank, the at least one tank can also furthermore comprise one or more further tanks. The at least one tank can thus have, for example, at least one rinsing tank which, for example, can be formed separately from the washing tank. For example, at least one rinsing fluid can be treated, for example temperature-controlled, in the at least one rinsing tank while a washing step is still proceeding in the cleaning chamber. The rinsing tank can comprise, for example, at least one boiler.

As explained above, the cleaning system furthermore has the at least one suction device which is connectable to the suction element of the cleaning basket and is intended for generating the negative pressure. Said suction device can be entirely or partially integrated in the cleaning basket. Alternatively or additionally, however, the suction device can also be entirely or partially integrated in the cleaning device.

The term "suction device", as is used here, is a broad term which is to be given its customary and common meaning, as understood by a person skilled in the art. The term is not restricted to a specific or adapted meaning. The term can, without restriction, refer in particular to basically any desired device which is configured to suck at least one fluid, in particular a liquid, out of a target space. The suction device can have in particular at least one pump and/or at least one vacuum source. The suction device can be entirely or partially or integrated fixedly in the cleaning device or else can also have, for example, a vacuum connection of the cleaning device, by means of which the cleaning device is connected to a vacuum line, for example an on-site vacuum line. Alternatively or additionally, the cleaning device, however, can also itself have at least one negative pressure source, also referred to as a vacuum source, in particular at least one pump. The suction device can be connected fixedly to the suction element of the cleaning basket, or can also be connectable releasably thereto. Again alternatively or additionally, the suction device can also be entirely or partially integrated in the cleaning basket, for example in the form of at least one Venturi nozzle.

The cleaning system can furthermore have at least one pressurization device with at least one pressure connection. A pressurization device can be understood in general as meaning a device which is configured to be able to provide a fluid, in particular a gas, at a pressure above the normal pressure, for example a pressure of at least 1.5 bar, preferably a pressure of at least 2 bar.

A pressure connection can be understood in principle as meaning any desired connection of the pressurization device, via which connection the fluid, in particular the gas, can be supplied to the pressurization device. In particular, this pressure connection can be arranged in the interior of the cleaning chamber and/or can be accessible from the interior of the cleaning chamber. Provision of a plurality of pressure connections is also conceivable.

The pressure connection is intended to be connectable to at least one gas-conducting element of the breathing apparatus in the cleaning chamber, preferably to a plurality of gas-conducting elements of a plurality of breathing apparatuses in the cleaning chamber. A gas-conducting element can be understood here in general as meaning an element which is charged with a respiratory gas during use of the breathing apparatus by a human or animal user or can come into contact with the respiratory gas in another way. In particular, it can be a breathing regulator and/or a breathing tube with at least one valve. In particular, the gas-conducting element can be an element which has at least one tube and/or at least one different type of gas-conducting device with an interior space and/or at least one valve to which cleaning fluid should generally not be applied. For example, the gas-conducting element can be a region of the breathing apparatus that, during operation, is charged with a pressure above the normal pressure, for example a gas-conducting region of a breathing apparatus above a normal pressure, for example above 1.5 bar, in particular above 2 bar. In particular, this can be a respiratory-gas-conducting region of a breathing regulator, wherein the breathing regulator can be in principle a single-stage or else a multi-stage breathing regulator. The gas-conducting element here can be, for example, part of a first stage and/or a second stage and/or optionally further stages of the breathing regulator or else a complete breathing regulator. For example, the gas-conducting element can be a region between a tube connection and a valve of a breathing regulator, or the gas-conducting element can comprise such a region.

A connection between the pressure connection and the gas-conducting element can be understood in general as meaning a fluidic connection, in particular a gas connection, such that the fluid under pressure of the pressurization device can be transferred into the gas-conducting element of the breathing apparatus, in particular into an internal space of the gas-conducting element, preferably without any fluid loss and/or pressure loss occurring in this connection. In addition, the connection between the pressure connection and the gas-conducting element of the breathing apparatus can optionally comprise at least one mechanical connection, in particular a positive and/or non-positive connection, so that the breathing apparatus can be fixedly connected to the pressure connection. For example, it can be a screw connection and/or a clamping connection and/or a tensioning connection, for which purpose the pressure connection and/or the breathing apparatus can in each case have at least one mechanical connecting element. It can be, in particular, a plug-in connection in the form of a quick-action coupling and/or a thread, for example a coupling piece for a respiratory connection of a breathing regulator. A quick-acting coupling should be understood in this case in general as meaning a gas-tight and/or liquid-tight plug-in connection between two fluid-conducting components, which plug-in connection can be mechanically secured by a mechanical fixing that can be produced and released in a simple and quick way, in particular without use of a screw closure, for example by at least one clip and/or a bayonet closure and/or a screw closure, for example a union nut. The connection can in particular be produced without a tool. In particular, the pressure connection can comprise a plurality of adaptors of a fixed or exchangeable design for connection to different types of gas-conducting elements. By means of these adaptors, a plurality of different gas-conducting elements can be connectable directly or indirectly to the pressure connection, for example different kinds and/or different types of gas-conducting elements, for example of different makes or manufacturers. For example, a set of adaptors with a plurality of different coupling pieces (for example coupling pieces of a quick-action coupling) and/or threads can be provided for the connection of different gas-conducting elements. For example, they can be different quick-action coupling systems and/or standard threads. Alternatively or in addition, the at least one pressure connection can, however, also be configured as a fixed pressure connection for a certain type of connecting element or for a certain type of gas-conducting element. It is particularly advantageous if the pressure connection and/or the coupling system is configured in such a manner that, firstly, gas cannot escape if no counterpart is connected, and that, in this case, no other medium, for example cleaning fluid, can enter the gas-conducting element either.

The pressurization device is configured to charge the gas-conducting element with compressed gas. A compressed gas can be understood in general as meaning any desired gas which has a pressure above standard pressure, that is to say a pressure of above 1 bar. It can be, in particular, a pressure above 1.5 bar, in particular above 2 bar, and particularly preferably above 3 bar. In particular, the pressurization device can be configured in such a manner that the pressurization with the compressed gas takes place in such a manner that all the cleaning fluid is kept away from an interior space of the breathing apparatus that is charged with the compressed gas. The compressed gas can be, for example, compressed air or some other gaseous medium at a positive pressure, for example nitrogen, carbon dioxide or the like. In particular, an inert gas can be used as the compressed gas. The cleaning device can, in particular, be configured in such a manner that the pressurization via the pressurization device takes place during at least one cleaning operation, for example during at least one program step of a single-step or multi-step cleaning program. In particular, the charging with the compressed gas can take place at the same time as the cleaning fluid is applied to the breathing apparatus. The pressure connection can accordingly be arranged in particular within the cleaning chamber such that the charging with compressed gas and application of cleaning fluid can take place at the same time.

The pressurization device can in particular have at least one element selected from the group consisting of:

at least one external pressure connection for connecting to an external compressed gas source, in particular an on-site compressed gas line and/or a compressed gas cylinder;

a compressed gas source which is integrated in the cleaning device, in particular an integrated compressed gas cylinder and/or an integrated compressor.

As explained above, the pressure connection can comprise in particular at least one positive and/or non-positive connecting element. This connecting element can be configured to produce a mechanical connection to the breathing apparatus in addition to the gas-tight connection. In particular, said at least one connecting element can have at least one quick-acting coupling and/or at least one thread. In general, the pressure connection can be in particular entirely or partially integrated in the cleaning basket. The cleaning basket can in general have in particular at least one releasable compressed gas connection to the cleaning device. The pressurization device can have in particular at least one valve, in particular at least one valve which is activatable by the controller of the cleaning device.

The cleaning basket can have in particular at least one connection, for example at least one releasable suction connection, for connecting the suction element to the suction device. This connection can be connectable, for example, manually to the suction device, for example by the suction connection having at least one releasable coupling element, for example again a quick-acting coupling, a screw connection or a bayonet closure. Alternatively or additionally, the connection can also be configured in such a manner that a connection of the suction element to the suction device is produced automatically, for example when the cleaning basket is introduced into the cleaning chamber of the cleaning device. Thus, for example, the cleaning basket can be pressed with the connection, for example the releasable suction connection, against a suction port or a suction opening of the cleaning device, when the cleaning basket is introduced into the cleaning chamber. For example, a press connection can be produced between the connection and the suction port and/or the suction opening of the cleaning device when the cleaning chamber is closed, for example by an opening device of the cleaning device, for example a door, being pressed against the cleaning basket.

As explained above, the suction device can comprise in particular at least one vacuum source which can be entirely or partially integrated in the cleaning device. Alternatively or additionally, however, the suction device can also have at least one vacuum connection which can be connectable to an on-site vacuum source, for example a vacuum line. In particular, the suction device can comprise at least one device selected from the group consisting of: a jet pump, in particular Venturi nozzle; a pump. This device can be in particular entirely or partially integrated in the cleaning device and/or the cleaning basket.

The suction device can be configured in particular to return cleaning fluid sucked out of the protective breathing mask into a fluidic system of the cleaning device, in particular into at least one tank of the cleaning device. For this purpose, the suction device can in particular separate cleaning fluid from a fluid flow sucked out of the interior space of the protective breathing mask. The cleaning system, in particular the cleaning device and/or in particular the suction device, can thus have in particular at least one liquid separator.

The suction device can have in particular at least one valve. Accordingly, the suction device can be operated, for example, in activated form, and therefore the suction operation can be carried out, for example, only at certain times. The at least one valve can be controlled, for example, by a controller of the cleaning device, and therefore the suction operation can be carried out, for example, as part of at least one program step of a cleaning program.

The suction device can have in particular at least one suction line, wherein the suction line is connectable to a connection of the cleaning basket. As explained above, this suction line can have, for example, at least one suction port and/or a suction opening which is connectable, for example manually and/or automatically, to at least one connection, for example at least one suction connection, of the cleaning basket and in particular of the suction element.

As explained above, the cleaning device can be configured in various ways. Thus, the cleaning device can be configured as a single-chamber cleaning device or else as a multi-chamber cleaning device. The cleaning device can be configured as a stationary cleaning device, in which the cleaning basket remains in a stationary manner in the cleaning chamber during the cleaning operation, or else as a transport cleaning device, in which the cleaning basket is transported through the cleaning chamber. In particular, the cleaning device can comprise a single-chamber washer, in particular a single-chamber washer for commercial use, in particular with at least two tanks. The single-chamber washer can thus have in particular at least one fluid tank formed separately from the cleaning chamber, with it being possible for at least one cleaning fluid to be conditioned, in particular heated, in the fluid tank independently of a cleaning process proceeding in the cleaning device. The single-chamber washer can additionally have at least one washing tank which is connected, for example, to the cleaning chamber. Alternatively, however, the cleaning device can also comprise a washer, for example a single-chamber washer, which is configured as what is referred to as a water-change washer and which, for example, has merely one tank and no separate fluid tank.

As explained above, the cleaning device can have in particular at least one controller and can be configured to carry out at least one cleaning program with at least two different program steps. The term “controller”, as is used here, is a broad term which is to be given its customary and common meaning, as understood by a person skilled in the art. The term is not restricted to a specific or adapted meaning. The term can, without restriction, refer in particular to a single-part or multi-part device of the cleaning device, which is configured to completely or partially control and/or to regulate an operation of the cleaning device. In particular, the controller can be configured to change, in particular to control and/or to regulate, one or more operating parameters of the cleaning device, for example at least one temperature, at least one pressure, at least one pump output, at least one valve position, at least one heating output or else a combination of two or more of the operating parameters mentioned. The controller can comprise in particular at least one data processing device, for example at least one processor. The controller can be configured in particular in terms of programming, for example to control or to carry out at least one cleaning program of the cleaning device. Accordingly, the controller facility can be partially realized by hardware or/also, alternatively or additionally, completely or partially by software. Furthermore, the controller can comprise at least one volatile and/or non-volatile data memory. Furthermore, the controller can comprise at least one interface, for example a human/machine interface for inputting commands and/or for outputting information, and/or a wireless or wired interface for unidirectional or bidirectional exchange of data and/or commands between the cleaning device and at least one further device. The controller can comprise in particular at least one computer and/or at least one processor. The controller can be in particular a central or decentralized machine controller of the cleaning device.

The controller can be configured in particular, for example configured by programming, in at least one program step of the cleaning program, to activate charging of the suction element with negative pressure such that penetrating cleaning fluid is sucked out of the at least one interior space of the protective breathing mask at least partially into the suction opening.

In a further aspect, a method for cleaning a breathing apparatus is proposed. The method comprises the steps mentioned in more detail below. These steps can be carried out in the sequence mentioned. However, a different sequence is also basically possible. Furthermore, two or more of the method steps mentioned can be carried out overlapping in time or simultaneously. Furthermore, one or more of the method steps mentioned can be carried out once or else repeatedly. Beyond the steps mentioned, the method can comprise further method steps which are not mentioned.

The method comprises the following steps:

a) providing at least one cleaning basket according to the invention, for example according to one or more of the above-described configurations and/or according to one or more of the embodiments yet to be described below;
b) fastening at least one protective breathing mask of the breathing apparatus to the at least one mask holder of the cleaning basket;
c) introducing the suction element into at least one interior space of the protective breathing mask in such a manner that at least a part of the suction element with the at least one suction opening projects into the interior space;
d) applying at least one cleaning fluid to the breathing apparatus; and
e) charging the suction element with negative pressure and sucking cleaning fluid out of the interior space via the suction opening.

The method can be carried out in particular in such a manner that a cleaning system according to the invention, for example according to one or more of the above-described configurations and/or according to one or more of the embodiments yet to be described below, is used. Thus, in particular, the application in method step d) can take place in the cleaning chamber of the cleaning device. The charging in step e) can also take place by means of the cleaning device or in a manner controlled by the cleaning device. For possible configurations, reference is made to the above description of the cleaning system.

As explained above, the suction in method step e) can take place entirely or partially while the at least one cleaning fluid is being applied to the breathing apparatus in step d) or else can be entirely or partially shifted downstream in terms of time of method step d). In particular, method step e) can be at least partially carried out after method step d). This shifting downstream in terms of time can take place by the fact that, with the cleaning basket remaining stationary, the suction is started in a manner shifted downstream in terms of time. Alternatively, when a cleaning basket is moving, for example in the case of a transport cleaning device, the shifting downstream can also take place spatially by, for example, first of all the at least one cleaning fluid being applied in at least one zone and the suction subsequently in at least one zone.

The method can furthermore comprise the following step:

f) charging at least one gas-conducting element of the breathing apparatus with compressed gas.

Method step f) can be carried out in particular at least temporarily simultaneously with one or both of method steps d) and e). In particular, method step f) can be carried out in an overlapping manner in terms of time with one or both of said method steps. In particular, the charging with the compressed gas can take place simultaneously as the cleaning fluid is applied to the breathing apparatus.

The method can furthermore comprise the following step:

g) at least one drying step, wherein the breathing apparatus is dried.

The drying step can take place within the cleaning chamber or else outside the cleaning chamber. For example, the drying step can take place by the items for cleaning being transferred from the cleaning chamber to drying, for example into a drying cabinet. The drying step can comprise, for example, heating of the breathing apparatus, for example drying by means of hot air. Other drying methods are also known, for example from dishwasher technology, for example condensation drying. Method step e), i.e. charging the suction element with negative pressure and sucking cleaning fluid off, can take place in particular at least temporarily before the drying step is carried out or else entirely or partially during the drying step. A drying which is carried out entirely or partially after the suction can generally be carried out more efficiently than the suction described.

The proposed cleaning basket, the proposed cleaning system and the proposed method for cleaning breathing apparatuses have numerous advantages over conventional devices and methods of the type mentioned. Thus, in particular the above-described technical challenges of known devices and methods of the type mentioned can be addressed.

The suction element can be configured in particular as a flexible movable suction member and/or as a suction pipe. The suction element can be used to suck off residues of the cleaning fluid, in particular residues of the cleaning fluid, in particular of the cleaning liquid, that remain in a draining volume of the protective breathing mask after the cleaning, for example in a partial region of the interior space. Said suction element can be charged with negative pressure, for example, by means of an internal or external suction device. Thus, for example, an external pressure line or pressure line which is already present in the cleaning device, for example the washer, can be used to provide or to generate a negative pressure. For example, a compressed air line can be used for supplying compressed air. The negative pressure for sucking off the liquid residues can be generated, for example, by means of at least one jet pump, in particular a Venturi nozzle.

Furthermore, cleaning fluid can be separated after being sucked off. For example, the cleaning system can be configured to divert and/or to separate a cleaning fluid/air mixture, in particular a water/air mixture. In particular, the suction device can be configured to conduct the cleaning fluid/air mixture from the outlet of the suction device, in particular in a manner shielded by the actual cleaning chamber, to the base of the cleaning chamber. Renewed wetting of the breathing apparatus with cleaning fluid, in particular with residual liquid, can thereby be prevented.

The interior space of the protective breathing mask can be referred to in particular as a draining volume or can have at least one draining volume. In washing technology and dishwasher technology, a draining volume typically refers to geometries of items for cleaning, from which cleaning liquid cannot automatically drain. In the case of the protective breathing masks, said draining volumes typically form between the mask wall and an encircling sealing lip which serves for sealing the protective breathing mask with respect to the user's face. Alternatively or additionally, the draining volume can also form in an extension at a lower end of the protective breathing mask, to which conventionally a filter and/or a breathing apparatus are connected. Said at least one draining volume can be completely or partially freed from remaining cleaning fluid by means of the proposed suction element. The above-described disadvantages of conventional cleaning devices can thereby be avoided. In particular, the drying operation can be accelerated, the cleaning result improved and an escape of cleaning fluid onto a floor of the working region at least substantially prevented.

The suction element can be adapted in terms of its geometry and/or its composition to the respective intended purpose. Thus, the suction element can have in particular at least one connection for negative pressure and at least one suction opening with which, for example, residual liquid can be sucked off. The suction element can be designed in particular in such a manner that the suction opening can easily be introduced at the lowest point or at least in the vicinity of the lowest point of the draining volume. Furthermore, the suction element can also be configured to assist fixing of the protective breathing mask to the mask holder in the cleaning basket.

The suction element can be mounted flexibly in particular in terms of its spatial orientation and/or position in the cleaning basket. For example, a variable orientation and/or form of the suction element can be possible. Movability, for example, in different directions, for example in all three directions in space, and, alternatively or additionally optionally a sprung suspension on the cleaning basket can additionally assist these requirements.

One or more mask holders can be provided in the cleaning basket. If a plurality of mask holders are provided, each mask holder can be assigned by way of example at least one suction element, for example. If a plurality of suction elements are provided in the cleaning basket, they can be connected to a common suction line, for example to a common channel Said suction line in turn can be connected or connectable to a suction device. The suction line can be connected or connectable, for example, to a suction pump, for example to a suction port of a Venturi nozzle, and can thereby be charged with negative pressure. As explained above, the suction device can also be entirely or partially integrated in the cleaning basket itself, and therefore, for example, the cleaning device provides only a pressure, for example compressed air, for the operation of the suction device, for example the Venturi nozzle.

A connection between the suction element of the cleaning basket and the suction device can be fixed or else releasable. For example, one or more tube connections can be provided which can be configured so as to be easily releasable, for example by means of one or more quick-acting couplings. Various materials are conceivable as materials for channels and connections, for example plastics, stainless steel, elastomers or else combinations of the materials mentioned and/or of other materials. The materials used should in general satisfy the requirements during the cleaning operation, in particular in respect of thermal and/or chemical stability.

In general, the charging of the negative pressure by means of the suction device can take place in various ways. Thus, apart from a pump integrated in the cleaning device, the suction action can also, alternatively or additionally, be produced with other means. The suction device can thus also have, for example, at least one water jet pump which can be operated, for example, with fresh water, for example fresh water from an on-site source.

Again alternatively or additionally, as explained above, a connection to an on-site negative pressure supply is possible or, alternatively or additionally, a suction device operated by an electric motor.

The suction device can be controlled, for example, via at least one valve, for example via at least one solenoid valve. The valve can be controlled in particular by at least one controller of the cleaning device, in particular at least one machine controller, for example depending on a cleaning program. Optionally, as explained above, a compressed air supply can additionally be switched on. Depending on requirements, residual liquid can also be sucked out of the draining volume between individual program steps, for example in order to improve the cleaning and rinsing result.

The suction device can be activated, for example, depending on requirement by, for example, a corresponding cleaning basket activating the installation with the aid of a basket identification present in the cleaning device. The cleaning device can thus have, for example, at least one identification device, for example at least one sensor, which identifies the type of cleaning basket and which can be configured in particular in order to identify whether the cleaning basket has the at least one suction element or whether it is a cleaning basket without such a suction element. The controller can accordingly then be configured to actuate a suction device or not.

The cleaning device can furthermore have one or more compressed air nozzles in order to blast the breathing apparatus with compressed air and/or compressed gas. For example, the cleaning device can have one or more flexible and/or movable compressed air nozzles by means of which compressed air and/or compressed gas can be conducted in a specific manner onto the at least one protective breathing mask, in particular in order to assist the draining of cleaning fluid and to improve the drying result. In this way, residues of cleaning fluid, for example at one or more viewing windows of the protective breathing mask, can be avoided or at least reduced, in particular in a region relevant for sight. The one or more compressed air nozzles can be provided, for example, with at least one dedicated switching element, for example with at least one valve which can be activated by the controller.

Overall, with the proposed suction element and the proposed suction device, for example, a residual quantity of liquid in a draining volume of the protective breathing mask can be reduced. This makes it possible, for example, to avoid manual shaking out following the cleaning. In particular, the draining volume can be sucked off at the end of the program sequence or else before the end of the program sequence, for example after the cleaning fluid has been applied. Cleaning fluid can also be sucked off between two program steps, for example between two program steps in which different types of cleaning fluid are applied to the breathing apparatus. For example, a suction step can be connected in between a washing step and a rinsing step in order to completely or partially remove washing fluid from the interior space, in particular from the draining volume, before the rinsing. A rinsing result can in particular be further improved in this manner.

Furthermore, a drying time can also be significantly improved, both during drying inside the cleaning chamber and during drying outside the cleaning chamber, for example in a drying cabinet. Thus, for example, by means of the at least one suction element and/or by means of the at least one suction device, the residual quantity of cleaning fluid in the protective breathing mask can be reduced in comparison to conventional methods. The necessary drying time, for example inside the cleaning device itself and/or in a drying cabinet, is thereby reduced.

Furthermore, the rinsing result can also be further improved by the above-described at least one compressed air nozzle. When additional compressed air nozzles are used, a residue-free drying can be achieved at important points, such as, for example, on a viewing window, with simultaneously minimized use of rinsing aid and with a reduced drying time.

In summary, the following embodiments are proposed without restricting further possible configures:

Embodiment 1: A cleaning basket for cleaning a breathing apparatus, comprising at least one basket rack, furthermore comprising at least one mask holder for holding at least one protective breathing mask in the cleaning basket, furthermore comprising at least one suction element, wherein the suction element has at least one suction opening and is configured to extend into the protecting breathing mask held by the mask holder, wherein the suction element is configured to be charged with negative pressure and to suck cleaning fluid out of at least one interior space of the protective breathing mask into the suction opening.

Embodiment 2: A cleaning basket according to the preceding embodiment, wherein the suction element has at least one element selected from the group consisting of: a suction pipe with the at least one suction opening, in particular a curved suction pipe; a suction tube with the at least one suction opening; a U pipe with the at least one suction opening; a pipe loop; a disk-shaped suction element with the at least one suction opening; a spoon-shaped suction element with the at least one suction opening.

Embodiment 3: The cleaning basket according to one of the preceding embodiments, wherein the suction element is configured to be at least partially flexible, in particular resilient.

Embodiment 4: The cleaning basket according to the preceding embodiment, wherein the suction element has at least one flexible tongue for introduction into the interior space of the protective breathing mask, wherein at least one suction opening is introduced in the flexible tongue.

Embodiment 5: The cleaning basket according to one of the preceding embodiments, wherein the suction element is connected to the mask holder, in particular is at least partially integrated in the mask holder.

Embodiment 6: The cleaning basket according to the preceding embodiment, wherein the suction element is integrated in the mask holder in such a manner that the suction opening is arranged between the basket rack and a point of the mask holder protruding the furthest from the basket rack.

Embodiment 7: The cleaning basket according to one of the preceding embodiments, wherein the basket rack comprises at least one basket base and basket walls.

Embodiment 8: The cleaning basket according to one of the preceding embodiments, wherein the mask holder and the suction element are connected to the basket rack.

Embodiment 9: The cleaning basket according to one of the preceding embodiments, wherein the mask holder has at least one projection protruding from the basket rack.

Embodiment 10: The cleaning basket according to one of the preceding embodiments, wherein the mask holder has a wire rack.

Embodiment 11: The cleaning basket according to one of the preceding embodiments, wherein the cleaning basket has at least one suction line, wherein the suction element is fluidically connected to the suction line, and wherein the suction line has at least one connection for the connection, in particular for the releasable connection, of a suction device.

Embodiment 12: The cleaning basket according to one of the preceding embodiments, wherein the cleaning basket furthermore has at least one pressure connection which is connectable to at least one gas-conducting element of the breathing apparatus, wherein the gas-conducting element can be charged with compressed gas while the cleaning fluid is being applied to the breathing apparatus.

Embodiment 13: The cleaning basket according to the preceding embodiment, wherein the pressure connection comprises at least one positive and/or non-positive connecting element in order to additionally produce a mechanical connection to the breathing apparatus, in particular a rapid-action coupling and/or a thread.

Embodiment 14: The cleaning basket according to one of the two preceding embodiments, wherein the cleaning basket has a releasable compressed gas connection for connecting the pressure connection to a pressurization device of a cleaning device.

Embodiment 15: The cleaning basket according to one of the preceding embodiments, wherein a small parts basket for receiving small parts of the breathing apparatus is additionally arranged in the cleaning basket, in particular a closable small parts basket with a basket cover.

Embodiment 16: A cleaning system for cleaning a breathing apparatus, in particular breathing regulators and/or protective breathing masks, comprising at least one cleaning basket according to one of the preceding embodiments, and at least one cleaning device, wherein the cleaning device has at least one cleaning chamber for receiving the at least one cleaning basket, wherein the cleaning device furthermore has at least one application device for applying at least one cleaning fluid to the breathing apparatus, wherein the cleaning system furthermore has at least one suction device which is connectable to the suction element of the cleaning basket and is intended for generating the negative pressure.

Embodiment 17: The cleaning system according to the preceding embodiment, wherein the cleaning system furthermore has at least one pressurization device with at least one pressure connection, wherein the pressure connection is connectable to at least one gas-conducting element of the breathing apparatus, wherein the pressurization device is configured to charge the gas-conducting element with compressed gas while the at least one cleaning fluid is being applied to the breathing apparatus.

Embodiment 18: The cleaning system according to the preceding embodiment, wherein the pressurization device has at least one element selected from the group consisting of:

at least one external pressure connection for connecting to an external compressed gas source, in particular an on-site compressed gas line and/or a compressed gas cylinder;

a compressed gas source which is integrated in the cleaning device, in particular an integrated compressed gas cylinder and/or an integrated compressor.

Embodiment 19: The cleaning system according to one of the two preceding embodiments, wherein the pressure connection comprises at least one positive and/or non-positive connecting element in order additionally to produce a mechanical connection to the breathing apparatus, in particular a quick-acting coupling and/or a thread.

Embodiment 20: The cleaning system according to one of the three preceding embodiments, wherein the pressure connection is entirely or partially integrated in the cleaning basket.

Embodiment 21: The cleaning system according to one of the four preceding embodiments, wherein the cleaning basket has a releasable compressed gas connection to the cleaning device.

Embodiment 22: The cleaning system according to one of the five preceding embodiments, wherein the pressurization device has at least one valve.

Embodiment 23: The cleaning system according to one of the preceding embodiments relating to a cleaning system, wherein the cleaning basket has a releasable connection for connecting the suction element to the suction device.

Embodiment 24: The cleaning system according to one of the preceding embodiments relating to a cleaning system, wherein the suction device comprises at least one pump, in particular a jet pump, in particular a jet pump with at least one Venturi nozzle.

Embodiment 25: The cleaning system according to one of the preceding embodiments relating to a cleaning system, wherein the suction device is configured to return cleaning fluid sucked out of the protective breathing mask into a fluidic system of the cleaning device, in particular into at least one tank of the cleaning device.

Embodiment 26: The cleaning system according to one of the preceding embodiments relating to a cleaning system, wherein the suction device has at least one liquid separator.

Embodiment 27: The cleaning system according to one of the preceding embodiments relating to a cleaning system, wherein the suction device has at least one valve.

Embodiment 28: The cleaning system according to one of the preceding embodiments relating to a cleaning system, wherein the suction device has at least one suction line, wherein the suction line is connectable to a connection of the cleaning basket.

Embodiment 29: The cleaning system according to one of the preceding embodiments relating to a cleaning system, wherein the cleaning device comprises a single-chamber washer.

Embodiment 30: The cleaning system according to the preceding embodiment, wherein the single-chamber washer has at least one fluid tank formed separately from the cleaning chamber, wherein at least one cleaning fluid can be conditioned, in particular can be heated, in the fluid tank independently of a cleaning process proceeding in the cleaning device.

Embodiment 31: The cleaning system according to one of the preceding embodiments relating to a cleaning system, wherein the cleaning device has at least one controller and is configured to carry out a cleaning program with at least two different program steps.

Embodiment 32: The cleaning system according to the preceding embodiment, wherein the controller is configured, in at least one program step of the cleaning program, to activate charging of the suction element with negative pressure such that penetrating cleaning fluid is sucked out of the at least one interior space of the protective breathing mask at least partially into the suction opening.

Embodiment 33: The cleaning system according to one of the two preceding embodiments, wherein the controller has at least one processor.

Embodiment 34: The cleaning system according to one of the preceding embodiments relating to a cleaning system, wherein the application device has at least one nozzle, in particular a nozzle selected from: a spray nozzle; a rinsing nozzle; a spray arm, in particular a rotatable spray arm; a nozzle which can be operated in the circulating operating mode.

Embodiment 35: The cleaning system according to one of the preceding embodiments relating to a cleaning system, wherein the cleaning fluid is selected from the group consisting of: an aqueous cleaning fluid; a cleaning fluid with at least one cleaning agent solution; a cleaning fluid with at least one rinsing aid; a cleaning fluid with at least one disinfecting means; a rinsing fluid; demineralized water; a heating cleaning fluid, in particular a cleaning fluid heated to a temperature of 30° C. to 70° C. and particularly preferably 60° C.

Embodiment 36: A method for cleaning a breathing apparatus, comprising:

a) providing at least one cleaning basket according to one of the preceding embodiments relating to a cleaning basket;
b) fastening at least one protective breathing mask of the breathing apparatus to the at least one mask holder of the cleaning basket;
c) introducing the suction element into at least one interior space of the protective breathing mask in such a manner that at least one part of the suction element with the at least one suction opening projects into the interior space;
d) applying at least one cleaning fluid to the breathing apparatus; and
e) charging the suction element with negative pressure and sucking cleaning fluid out of the interior space via the suction opening.

Embodiment 37: The method according to the preceding embodiment, wherein the method comprises the use of at least one cleaning system according to one of the preceding embodiments relating to a cleaning system.

Embodiment 38: The method according to one of the two preceding embodiments, wherein method step e) is at least partially carried out after method step d).

Embodiment 39: The method according to one of the preceding embodiments relating to a method, wherein the method furthermore comprises:

f) charging at least one gas-conducting element of the breathing apparatus with compressed gas.

Embodiment 40: The method according to the preceding embodiment, wherein method step f) is at least temporarily carried out simultaneously with one or both of method steps d) and e).

Embodiment 41: The method according to one of the preceding embodiments relating to a method, wherein the method furthermore comprises:

g) at least one drying step, wherein the breathing apparatus is dried.

BRIEF DESCRIPTION OF THE FIGURES

Further details and features emerge from the description below of exemplary embodiments, in particular in conjunction with the dependent claims. Here, the respective features can be realized by themselves alone or together in combination with one another. The invention is not restricted to exemplary embodiments. The exemplary embodiments are schematically illustrated in the figures. The same reference numbers in the individual figures refer to elements which are identical or functionally the same or correspond to one another in respect of their functions.

Specifically.

DESCRIPTION OF THE EXEMPLARY EMBODIMENTS

Figure 1:
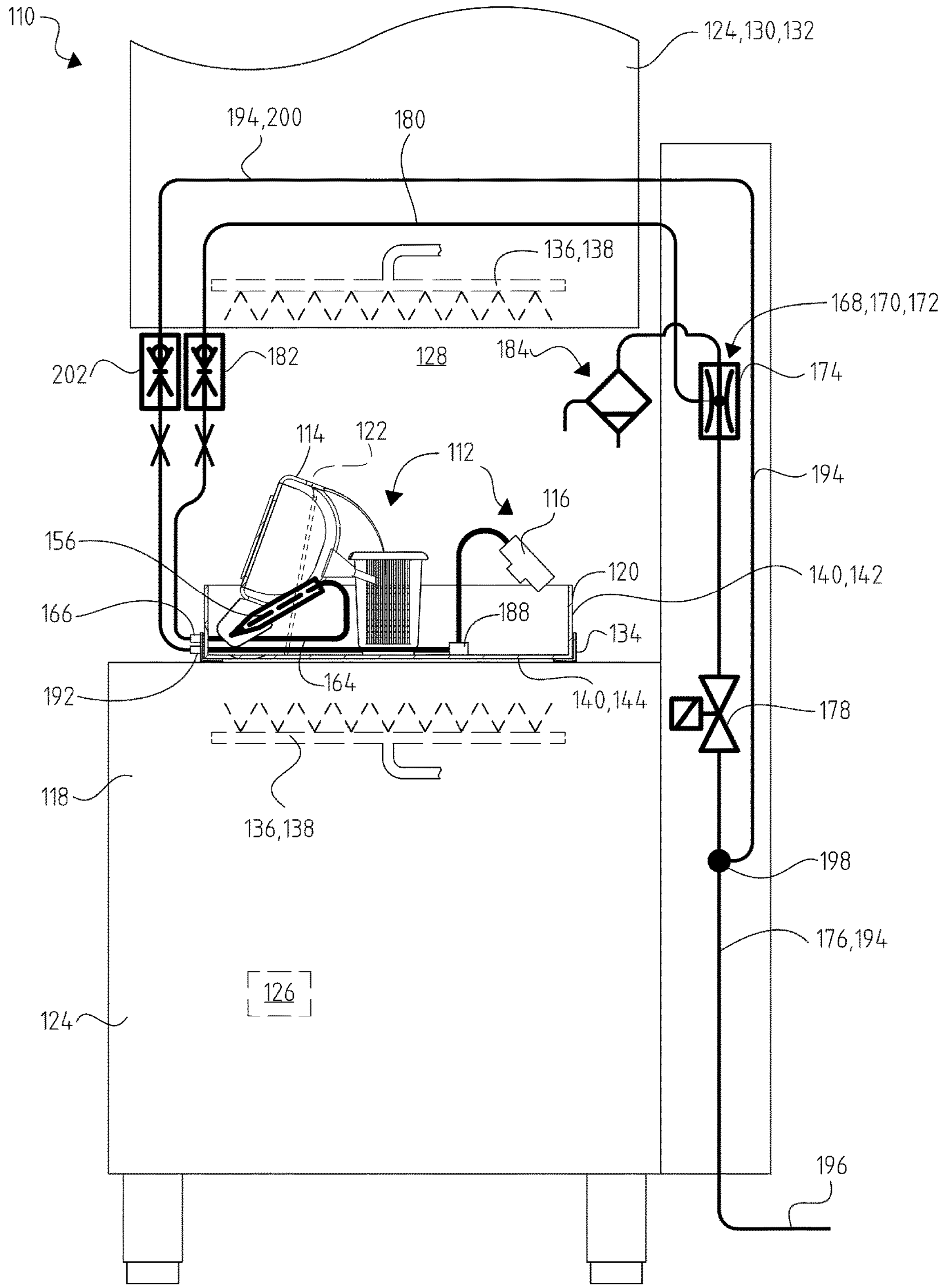
FIG. 1 shows an exemplary embodiment of a cleaning system for cleaning a breathing apparatus, in a sectional illustration from the side.

FIG. 1 illustrates, in a sectional illustration from the side, an exemplary embodiment of the cleaning system 110 for cleaning a breathing apparatus 112. The breathing apparatus comprises at least one protective breathing mask 114 and furthermore, optionally, additional components, such as, for example, gas-conducting elements 116, for example breathing regulators.

Figure 2:
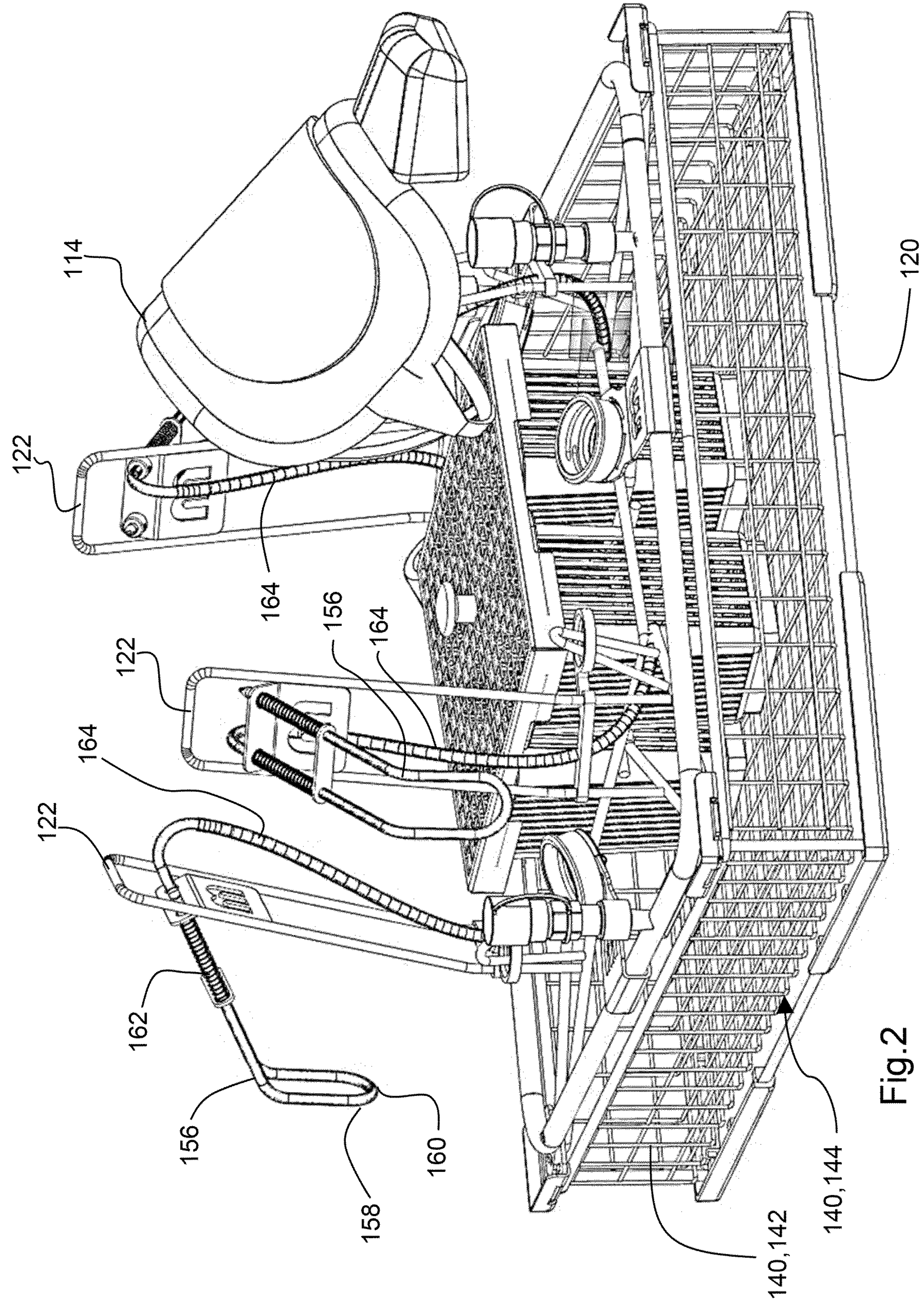
FIG. 2 shows a perspective illustration of an exemplary embodiment of a cleaning basket obliquely from above.
Figure 3:
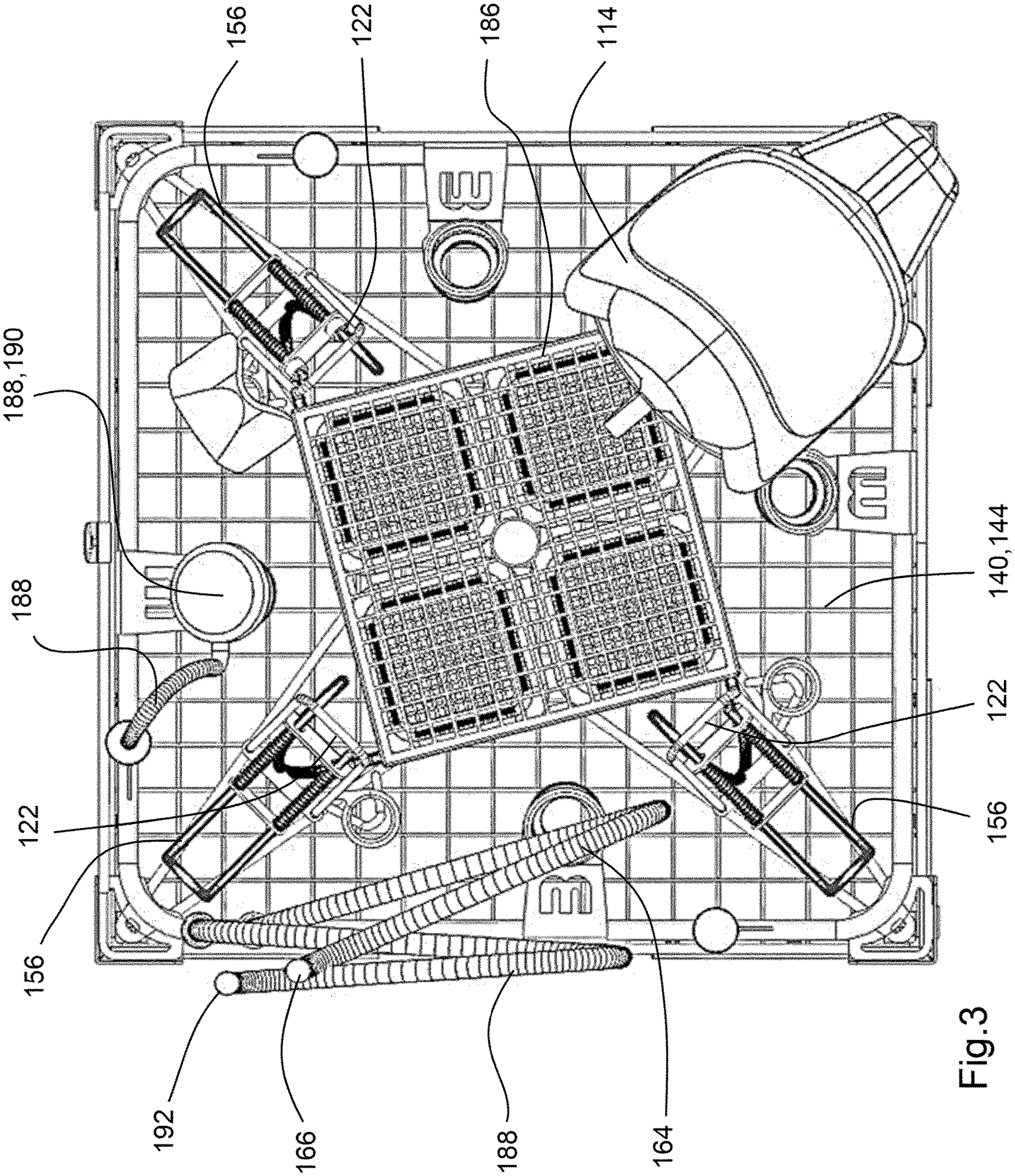
FIG. 3 shows a top view of the cleaning basket according to FIG. 2.
Figure 4:
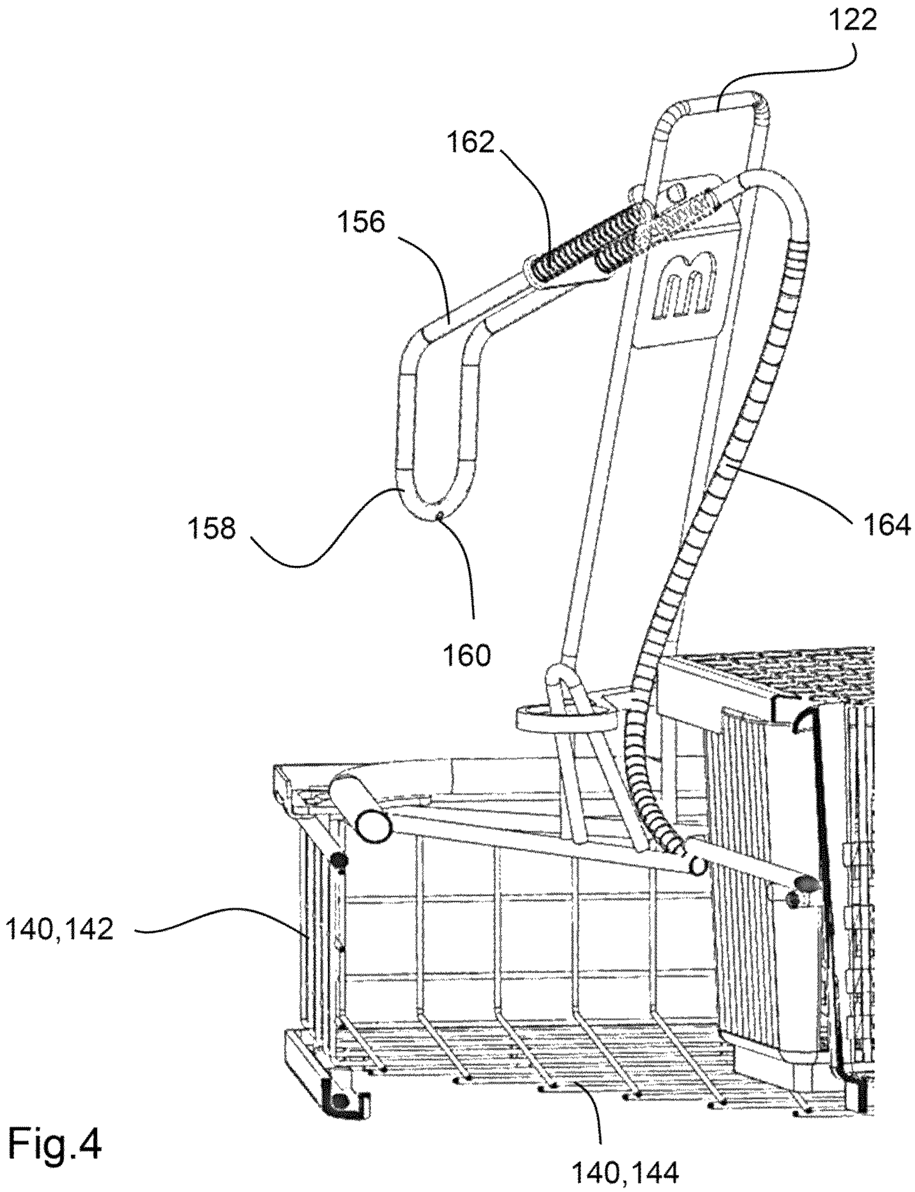
FIG. 4 shows a perspective detailed view of a mask holder of the cleaning basket according to FIG. 2 without a protective breathing mask.
Figure 5:
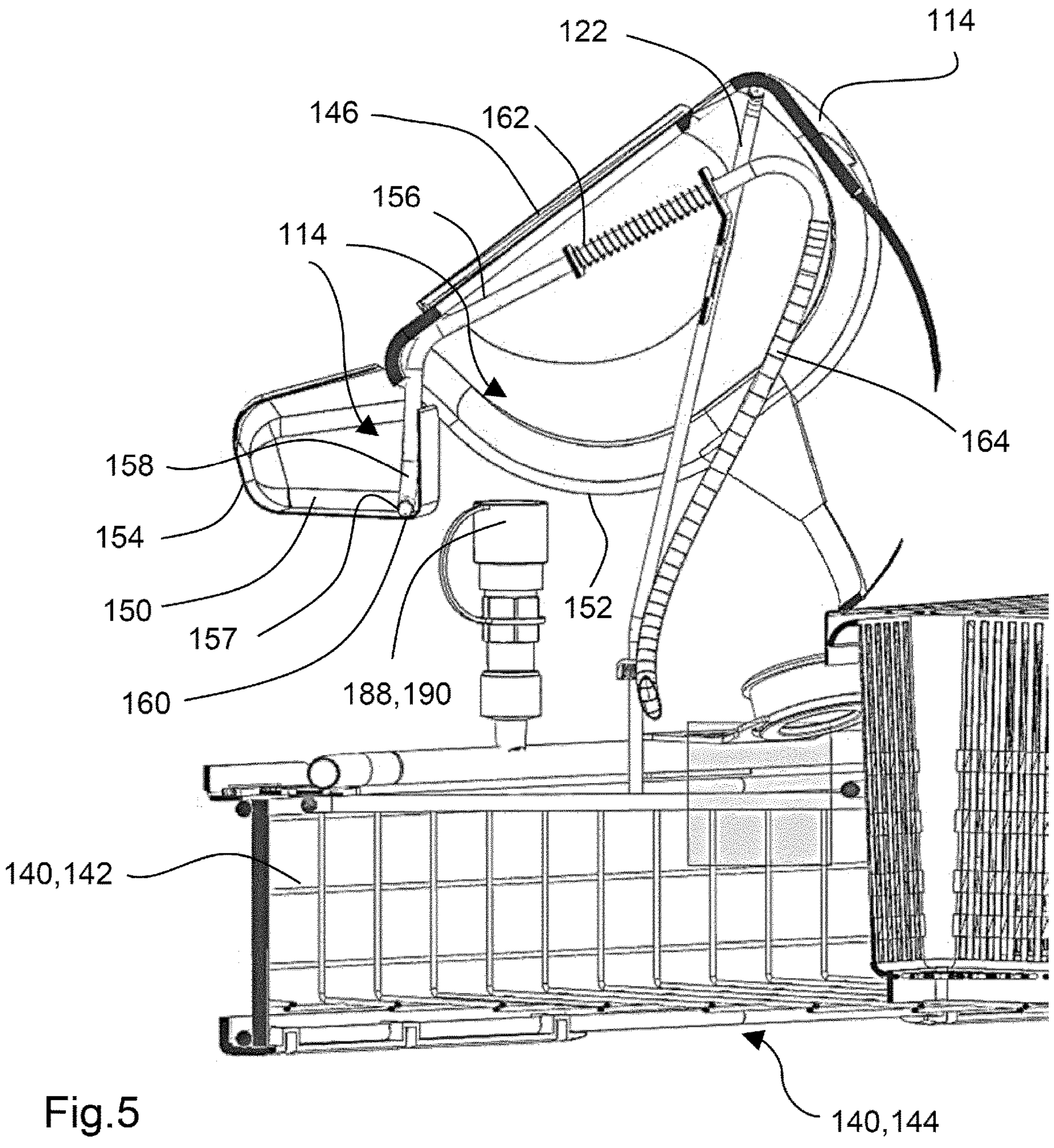
FIG. 5 shows a perspective partial sectional view of the mask holder with a protective breathing mask stretched thereon.

In this exemplary embodiment, the cleaning system 110 comprises a cleaning device 118 and at least one cleaning basket 120. The cleaning basket 120 is illustrated schematically in FIG. 1. Detailed views of a possible configuration of said cleaning basket 120 are shown in FIGS. 2-5. FIG. 2 shows a perspective illustration of the cleaning basket 120 obliquely from above, FIG. 3 shows a top view of the cleaning basket 120, FIG. 4 shows a perspective detailed view of a mask holder 122 without a protective breathing mask 114, and FIG. 5 shows a perspective partial sectional view of the mask holder 122 with a protective breathing mask 114 stretched thereon. These figures will be explained in context below.

The cleaning device 118 has a housing 124 in which various components of the cleaning device 118 are accommodated. For example, a controller 126 of the cleaning device 118 can also be accommodated in said housing 124. The housing 124 surrounds a cleaning chamber 128 for receiving the at least one cleaning basket 120. The housing 124 can have, for example, an opening device 130 by means of which the cleaning chamber 128 can be opened or closed in order to introduce the cleaning basket 120 into the cleaning chamber 128. In the exemplary embodiment illustrated, the opening device 130 is illustrated as a hood 132.

Accordingly, the cleaning device 118 can be configured, for example, as a pass-through washer. However, other configurations are also possible, for example configurations in which the opening device 130 is designed as a flap or door. The cleaning chamber 128 is shown in an open state in FIG. 1. For example, a basket receptacle 134, for example a rail system, can be provided in the cleaning chamber 128.

The cleaning device 118 comprises at least one application device 136 for applying at least one cleaning fluid to the breathing apparatus 112. With regard to possible configurations of the application device 136, reference can be made by way of example to the above prior art, for example to WO 2011/144518 A2. In particular, the application device 136 can have at least one nozzle system 138. Furthermore, the application device 136 can have at least one, preferably at least two tanks for receiving the at least one cleaning fluid, and one or more pumps.

As can be seen, for example, in FIG. 2, the cleaning basket 120 in the exemplary embodiment illustrated comprises a basket rack 140 with a basket wall 142 and a basket base 144. The cleaning basket 120 furthermore comprises the at least one mask holder 122 which has already been mentioned, wherein four mask holders 122 by way of example are provided in the exemplary embodiment shown. Said mask holders can be oriented, for example, in such a manner that the protective breathing masks respective stretched thereon point into the four corners of the cleaning basket 120. A different number is also possible.

In the exemplary embodiment shown, the mask holders 122 are connected fixedly or releasably to the basket rack 140, for example can be placed releasably as a rack onto the basket rack 140.

As can be seen in the figures, the mask holders 122 can be designed, for example, as wire loops, for example made from round wire. However, other embodiments are also possible in principle, for example embodiments in which the mask holders 122 have a head shape or the shape of a face.

As can be seen, for example, in FIG. 5, the at least one protective breathing mask 114 can be placed or stretched onto the mask holder 122. This can preferably take place in such a manner that at least one viewing window 146 of the protective breathing mask 114 faces upward. At least one interior space 148 of the protective breathing mask 114 is as a rule formed, by contrast, on the lower side, said interior space 148 being partially surrounded by the protective breathing mask 114 and, as a rule, being open downward in the stretched-out state. Nevertheless, one or more draining volumes 150 as a rule form in said interior space 148, for example in the region of one or more seals 152 and/or in a connection region 154 for at least one gas-conducting element 116. Since the protective breathing mask 114 is conventionally cleaned from above and from below and cleaning fluid applied, for example in the case of the arrangement according to FIG. 1, cleaning fluid as a rule accumulates as a rule in this interior space 148, as described above, said cleaning fluid not being able to flow away completely after the end of the application of the cleaning fluid. This residual quantity of cleaning fluid in many cases interferes with the cleaning operation and a subsequent drying operation within the cleaning device 118 and/or in a separate drying cabinet and, furthermore, can lead to safety problems due to the risk of slipping in the event that it leaks onto a floor in front of the cleaning device 118.

To avoid this problem, the cleaning basket 120 furthermore has at least one suction element 156. Said suction element 156 is configured, for example, as a pipe, as a tube, as a channel or in some other way in such a manner that preferably a lumen 157 is formed in its interior, by means of which the suction element 156 can be charged with a vacuum or with a negative pressure. For example, in this and also in other exemplary embodiments, the suction element 156 can be designed as a curved pipe loop 158 or can comprise a pipe loop 158, wherein preferably the pipe loop 158 or the curved region thereof points downward.

The suction element 156 comprises at least one suction opening 160 which is formed, for example, at the lowest point of the pipe loop 158. As can be seen, for example, in FIG. 5, the suction element 156 is configured in such a manner that it can extend into the interior space 148 of the protective breathing mask 144 held by the mask holder 122. For example, in each case at least one suction element 156 can be assigned to in each case one mask holder 122. The suction element 156 is configured to be charged with negative pressure, for example by a corresponding vacuum or a negative pressure being applied to the lumen 157. In this way, cleaning fluid can be sucked out of the interior 148 into the suction opening 160 in order to completely or partially remove the cleaning fluid from the interior space 148, in particular from the draining volume 150.

In order to facilitate the introduction of the suction element 156 into the interior space 148, the suction element 156 can be configured in particular to be at least partially flexible, in particular resilient. As can be seen, for example, in FIG. 4, for this purpose the suction element 156 can be mounted, for example, resiliently. As shown by way of example in the figures, the suction element 156 can extend, for example, directly or indirectly from the mask holder 122, wherein an extension of said extent can be variably configured, for example by means of a spring bearing 162. In this manner, for example, the pipe loop 158 which is shown can be configured as a flexible tongue. Furthermore, it can be ensured by means of this flexibility, for example, that the suction opening 160 is arranged, for example, in the vicinity of the lowest point of the draining volume 150.

The cleaning basket 120 furthermore has at least one suction line 164, wherein the suction element 156 is fluidically connected to the suction line 164 in such a manner that the suction element 156 can be charged with a negative pressure via the suction line 164. Said suction line 164, if a plurality of suction elements 156 are provided in the cleaning basket 120, can provide a joint or else separate charging with negative pressure for said suction elements 156. The suction line 164 can be designed to be rigid or else flexible.

The suction line 164 can have in particular at least one connection 166 for the connection of the at least one suction element 156 to a negative pressure source. In particular, the connection 166 can permit a connection, preferably a releasable connection, to a suction device 168 that is shown by way of example in FIG. 1. In this connection, there are a plurality of possibilities which can be combined with one another. Thus, the suction device 168 can be integrated, for example completely, in the cleaning device 118, as shown in FIG. 1. Alternatively or additionally, the suction device 168 can, however, also entirely or partially rely on on-site devices, for example a vacuum line. Again alternatively or additionally, the suction device 168 can also be entirely or partially integrated in the cleaning basket 120.

In particular, the suction device 168, as shown in FIG. 1, can have a pump 170. This pump can be designed, for example, as a jet pump 172 and can comprise a Venturi nozzle 174. For example, the cleaning device can have a compressed gas line 176 which is connected to the Venturi nozzle 174, for example via a valve 178. The Venturi nozzle 174 is for its part connected or connectable to the connection 166 of the cleaning basket 120, for example via a suction line 180. This connection can take place, for example, automatically when the cleaning basket 120 is introduced into the cleaning chamber 128, or else manually. An automatic connection can be produced, for example, upon closing the opening device 130. Furthermore, one or more valves, for example at least one nonreturn valve 182, can be introduced into the suction line 180. It is pointed out that, instead of the jet pump 172 which is shown, a different type of suction device 168 can alternatively or additionally also be used, for example a different type of vacuum pump or liquid pump.

Furthermore, the suction device 168 can have at least one liquid separator 184 which is likewise shown by way of example in FIG. 1. Said liquid separator can be connected, for example, to the Venturi nozzle 174 and/or to a different type of jet pump 172. The liquid separator 184 can be configured, for example, in such a manner that separated cleaning fluid that has been sucked out of the interior space 148 is returned into a fluidic system of the cleaning device 118. For example, the liquid separator 184 can be entirely or partially arranged in the cleaning chamber 128 or connected thereto. For example, separated cleaning fluid can be returned directly or indirectly into a tank of the cleaning device 118.

For further possible components of the cleaning basket 120, reference can be made by way of example to WO 2011/144518 A2. In particular, for accommodating small parts, the cleaning basket 120 can have at least one small parts basket in which, for example, accessories can be cleaned without assignment to the protective breathing masks 114 being lost.

Furthermore, the sucking off described here can also be combined with the principle of the pressurization, described in WO 2011/144518 A2, of gas-conducting elements 116 while cleaning fluid is being applied to the breathing apparatus 112 in order to prevent cleaning fluid from penetrating the gas-conducting elements 116. As can be seen in FIG. 1, this principle can be supported on the same compressed gas line 176 as the suction. However, a separate pressurization is also possible.

In order to realize said pressurization for gas-conducting elements 116, the cleaning basket 120 can additionally have at least one pressure connection 188 which can be seen, for example, in FIGS. 1, 3 and 5. Said pressure connection 188 can be configured to charge the gas-conducting element 116 with compressed gas while the cleaning fluid is being applied to the breathing apparatus 112. For this purpose, the pressure connection 188 can have, for example, at least one quick-acting coupling 190. The pressure connection 188 can be connectable to a pressurization device 194 of the cleaning device 118, for example via a releasable compressed gas connection 192. This connection can in turn be produced manually or else, for example, can in turn be produced automatically, for example upon closing the opening device 130. The pressurization device 194 can comprise, for example, a compressed gas source which is integrated in the cleaning device 118, or else, as shown by way of example in FIG. 1, can rely on an external compressed gas source, for example an on-site compressed gas supply 196. Said on-site compressed gas supply 196 can optionally also be used at the same time, for example by means of a branch 198, for the operation of the suction device 168. The pressurization device 194 can comprise, for example, a compressed gas line 200 which is connectable to the compressed gas connection 192. Optionally in turn at least one nonreturn valve 202 can be provided in the compressed gas line 200.

The pressurization device 194 can furthermore also be used in order additionally to blast the breathing apparatus 112 with compressed gas, for example compressed air, for example by means of one or more nozzles which are not illustrated in FIG. 1. This can be used, for example, during drying in order additionally to promote drainage of cleaning fluid from the breathing apparatus 112, in particular from the protective breathing mask 114.

The cleaning device 118 can be configured in particular as an automatic programmed washer and can be configured to carry out at least one cleaning program with a plurality of program steps by means of the controller 126. For example, the cleaning fluid can be applied in at least one program step, wherein, for example, said at least one program step can comprise at least one washing step and at least one rinsing step. During said application with cleaning fluid, the above-described pressurization of the at least one gas-conducting element 116 can take place. The suction can take place already during this application or else in a subsequent program step. This can take place, for example, in a separate suction step. This step can also be entirely or partially integrated in a drying operation which, as described above, can take place entirely or partially in the cleaning device 118. Alternatively or additionally, for example after the suction step is carried out, the drying, however, can also take place entirely or partially outside the cleaning chamber 128, for example in a drying cabinet.

LIST OF REFERENCE SIGNS

110 Cleaning system
112 Breathing apparatus
114 Protective breathing mask
116 Gas-conducting element
118 Cleaning device
120 Cleaning basket
122 Mask holder
124 Housing
126 Controller
128 Cleaning chamber
130 Opening device
132 Hood
134 Basket receptacle
136 Application device
138 Nozzle system
140 Basket rack
142 Basket wall
144 Basket base
146 Viewing window
148 Interior space
150 Draining volume
152 Seal
154 Connection region
156 Suction element
157 Lumen
158 Pipe loop
160 Suction opening
162 Spring bearing
164 Suction line
166 Connection
168 Suction device
170 Pump
172 Jet pump
174 Venturi nozzle
176 Compressed gas line
178 Valve
180 Suction line 182 Nonreturn valve
184 Liquid separator
186 Small parts basket
188 Pressure connection
190 Quick-acting coupling
192 Compressed gas connection
194 Pressurization device
196 Compressed gas supply
198 Branch
200 Compressed gas line
202 Nonreturn valve

The invention claimed is:

1. A cleaning basket for cleaning breathing apparatus, comprising at least one basket rack, furthermore comprising at least one mask holder for holding at least one protective breathing mask in the cleaning basket, furthermore comprising at least one suction element, wherein the suction element defines at least one suction opening, wherein the suction element is connected to the mask holder, wherein the suction element extends from the mask holder to at least in part support the protective breathing mask, wherein the suction element extends into at least one interior space of the protective breathing mask when held by the mask holder, wherein the suction opening is positioned along the suction element within the interior space of the protective breathing mask when held by the mask holder, wherein the suction element is configured to be charged with negative pressure, and wherein the suction element is configured to suck cleaning fluid out of the interior space of the protective breathing mask via the suction opening.

2. The cleaning basket as claimed in claim 1, wherein the suction element has at least one element selected from the group consisting of: a suction pipe with the at least one suction opening; a curved suction pipe with the at least one suction opening; a suction tube with the at least one suction opening; a U pipe with the at least one suction opening; a pipe loop; a disk-shaped suction element with the at least one suction opening; a spoon-shaped suction element with the at least one suction opening.

3. The cleaning basket as claimed in claim 1, wherein the suction element is configured to be at least partially flexible.

4. The cleaning basket as claimed in claim 3, wherein the suction element has at least one flexible tongue for introduction into the interior space of the protective breathing mask, wherein at least one suction opening is introduced in the flexible tongue.

5. The cleaning basket as claimed in claim 1, wherein the suction element is connected to the mask holder.

6. The cleaning basket as claimed in claim 1, wherein the cleaning basket has at least one suction line, wherein the suction element is fluidically connected to the suction line, and wherein the suction line has at least one connection for the connection of a suction device.

7. The cleaning basket as claimed in claim 6, wherein the suction device is entirely or partially integrated in the cleaning basket.

8. The cleaning basket as claimed in claim 1, wherein the cleaning basket furthermore has at least one pressure connection which is connectable to at least one gas-conducting element of the breathing apparatus, wherein the gas-conducting element can be charged with compressed gas while the cleaning fluid is being applied to the breathing apparatus.

9. The cleaning basket as claimed in claim 8, wherein the cleaning basket has a releasable compressed gas connection for connecting the pressure connection to a pressurization device of a cleaning device.

10. The cleaning basket as claimed in claim 1, wherein:
the suction element has a curved suction pipe that has a curved shape; and
the curved suction pipe has the suction opening.

11. The cleaning basket as claimed in claim 1, wherein:
the suction element has a U pipe that is U-shaped; and
the U pipe has the suction opening.

12. The cleaning basket as claimed in claim 1, wherein the suction element has a pipe loop with a looped shape.

13. A cleaning system for cleaning breathing apparatus, comprising
at least one cleaning basket as claimed in claim 1, and
at least one cleaning device, wherein the cleaning device has at least one cleaning chamber for receiving the at least one cleaning basket, wherein the cleaning device furthermore has at least one application device for applying at least one cleaning fluid to the breathing apparatus,
wherein the cleaning system furthermore has at least one suction device which is connectable to the suction element of the cleaning basket and is configured for generating the negative pressure.

14. The cleaning system as claimed in claim 13, wherein the cleaning system furthermore has at least one pressurization device with at least one pressure connection, wherein the pressure connection is connectable to at least one gas-conducting element of the breathing apparatus, wherein the pressurization device is configured to charge the gas-conducting element with compressed gas while the at least one cleaning fluid is being applied to the breathing apparatus.

15. The cleaning system as claimed in claim 13, wherein the cleaning basket has a releasable connection for connecting the suction element to the suction device.

16. The cleaning system as claimed in claim 13, wherein the suction device comprises at least one pump.

17. The cleaning system as claimed in claim 16, wherein the pump has at least one jet pump.

18. The cleaning system as claimed in claim 17, wherein the jet pump has at least one Venturi nozzle.

19. The cleaning system as claimed in claim 18, wherein the cleaning device has a compressed gas line which is connected to the Venturi nozzle.

20. The cleaning system as claimed in claim 13, wherein the suction device is configured to return cleaning fluid sucked out of the protective breathing mask into a fluidic system of the cleaning device.

21. The cleaning system as claimed in claim 13, wherein the suction device has at least one liquid separator.

22. The cleaning system as claimed in claim 13, wherein the suction device has at least one suction line, wherein the suction line is connectable to a connection of the cleaning basket.

23. The cleaning system as claimed in claim 10, wherein the cleaning device has at least one controller and is configured to carry out a cleaning program with at least two different program steps, wherein the controller is configured, in at least one program step of the cleaning program, to activate charging of the suction element with negative pressure such that penetrating cleaning fluid is sucked out of the at least one interior space of the protective breathing mask at least partially into the suction opening.

24. A method for cleaning breathing apparatus, comprising:
a) providing at least one cleaning basket as claimed in claim 1;
b) fastening at least one protective breathing mask of the breathing apparatus to the at least one mask holder of the cleaning basket;

c) introducing the suction element into at least one interior space of the protective breathing mask in such a manner that at least one part of the suction element with the at least one suction opening projects into the interior space;

d) applying at least one cleaning fluid to the breathing apparatus; and e) charging the suction element with negative pressure and sucking cleaning fluid out of the interior space via the suction opening.

25. The method as claimed in claim 24, wherein the method furthermore comprises:

f) charging at least one gas-conducting element of the breathing apparatus with compressed gas.

* * * * *